US011547261B2

(12) United States Patent
    Choe

(10) Patent No.: US 11,547,261 B2
(45) Date of Patent: Jan. 10, 2023

(54) MOVING ROBOT AND CONTROL METHOD THEREOF

(71) Applicant: LG ELECTRONICS INC., Seoul (KR)

(72) Inventor: Suuk Choe, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1069 days.

(21) Appl. No.: 16/096,872

(22) PCT Filed: Apr. 29, 2017

(86) PCT No.: PCT/KR2017/004620
    § 371 (c)(1),
    (2) Date: Oct. 26, 2018

(87) PCT Pub. No.: WO2017/188800
    PCT Pub. Date: Nov. 2, 2017

(65) Prior Publication Data
    US 2019/0133397 A1    May 9, 2019

(30) Foreign Application Priority Data
    Apr. 29, 2016  (KR) .................. 10-2016-0053317

(51) Int. Cl.
    *G05D 1/02*         (2020.01)
    *A47L 11/24*        (2006.01)
    (Continued)

(52) U.S. Cl.
    CPC ................. *A47L 11/24* (2013.01); *A47L 9/28* (2013.01); *B25J 9/00* (2013.01); *B25J 9/16* (2013.01);
    (Continued)

(58) Field of Classification Search
    CPC ........ A47L 11/24; A47L 9/28; A47L 2201/04; A47L 2201/022; A47L 9/2852; B25J 9/00;
    (Continued)

(56) References Cited

U.S. PATENT DOCUMENTS

2006/0155436 A1    7/2006  Matsunaga
2010/0070125 A1    3/2010  Lee et al.
(Continued)

FOREIGN PATENT DOCUMENTS

EP    2 381 328    10/2011
EP    2 447 800     5/2012
(Continued)

OTHER PUBLICATIONS

European Search Report dated Nov. 21, 2019 issued in EP Application No. 177899846.
(Continued)

*Primary Examiner* — Masud Ahmed
(74) *Attorney, Agent, or Firm* — Ked & Associates, LLP

(57) ABSTRACT

Disclosed are a moving robot and a control method thereof, and the moving robot performs cleaning by moving based on a map and is able to determine, based on a global localization function, the current position on the map no matter where the moving robot is positioned, so that the moving robot is capable of recognizing the current position on the map, and, even when the position of the moving robot is arbitrarily changed, the moving robot is able to recognize the position thereof again and move to an exact designated area, so that the moving robot is capable of perform designated cleaning and move rapidly and accurately, thereby performing cleaning efficiently.

31 Claims, 20 Drawing Sheets

(51) Int. Cl.
  *B25J 11/00* (2006.01)
  *B25J 9/16* (2006.01)
  *B25J 9/00* (2006.01)
  *A47L 9/28* (2006.01)
  *B25J 19/02* (2006.01)

(52) U.S. Cl.
  CPC ............... *B25J 11/00* (2013.01); *B25J 19/02* (2013.01); *G05D 1/0227* (2013.01); *G05D 1/0251* (2013.01); *G05D 1/0274* (2013.01); *A47L 2201/04* (2013.01); *G05D 2201/0203* (2013.01)

(58) Field of Classification Search
  CPC ..... B25J 9/16; B25J 11/00; B25J 19/02; B25J 9/0003; B25J 9/162; B25J 9/1664; B25J 9/1697; B25J 11/0085; B25J 19/023; G05D 1/0227; G05D 1/0251; G05D 1/0274; G05D 2201/0203; G05D 2201/0215; G05D 1/0219; G05D 1/0246
  USPC ........................................................... 701/26
  See application file for complete search history.

(56) References Cited

U.S. PATENT DOCUMENTS

| | | |
|---|---|---|
| 2011/0264305 A1 | 10/2011 | Choe et al. |
| 2012/0109376 A1 | 5/2012 | Lee et al. |
| 2013/0000675 A1 | 1/2013 | Hong et al. |
| 2016/0027207 A1* | 1/2016 | Hillen ..................... G06T 17/00 348/207.1 |
| 2016/0059770 A1* | 3/2016 | Ji .......................... H04N 5/2256 348/159 |
| 2017/0285651 A1* | 10/2017 | Ji .......................... G05D 1/0246 |
| 2018/0004217 A1* | 1/2018 | Biber .................. G05D 1/0274 |

FOREIGN PATENT DOCUMENTS

| | | |
|---|---|---|
| EP | 2 540 203 | 1/2013 |
| JP | 2005-211367 | 8/2005 |
| KR | 10-0844206 | 7/2008 |
| KR | 10-2010-0031277 | 3/2010 |
| KR | 10-2012-0102955 | 9/2012 |
| KR | 10-2016-0021991 | 2/2016 |
| KR | 10-2016-0036008 | 4/2016 |

OTHER PUBLICATIONS

Korean Office Action dated Mar. 11, 2020 issued in KR Application No. 10-2018-7034267.

International Search Report (with English Translation) and Written Opinion dated Aug. 16, 2017 issued in Application No. PCT/KR2017/004620.

International Search Report dated Aug. 16, 2017 issued in Application No. PCT/KR2017/004620.

* cited by examiner

MOVING ROBOT AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2017/004620, filed Apr. 29, 2017, which claims priority to Korean Patent Application No. 10-2016-0053317, filed Apr. 29, 2016, whose entire disclosures are hereby incorporated by reference.

TECHNICAL FIELD

The present invention relates to a moving robot and a control method thereof, and particularly to a moving robot capable of cleaning a designated area using a map of the surroundings of the moving robot and a control method thereof.

BACKGROUND ART

A Moving robot is an apparatus that automatically performs cleaning by traveling in an area to be cleansed and suctioning foreign substances such as dust from a floor.

The moving robot is provided with a rechargeable battery and thus able to freely move on its own using operation power of the battery, and, during traveling, the moving robot performs cleaning by suctioning foreign substances on the floor and, when necessary, returns back to a charging base to charge the battery.

Usually, such a moving robot detects a distance to an obstacle such as furniture, office equipment, a wall, etc. installed in the travel area, and performs obstacle avoidance operation by controlling a left wheel and a right wheel.

An existing moving robot is not capable of distinguishing an area, performs cleaning by moving with reference to the current position, and change a direction when there is an obstacle during traveling in straight, and thus, there are problems in that the exiting robot cleans a particular area repeatedly and is not able to return back to its position after traveling.

Accordingly, developing a moving robot capable of cleaning a particular area based on a prestored map while preventing redundant cleaning is recently on trend.

However, even though the moving robot performs cleaning using a map, the moving robot has to recognize the current position on the map in order to move to a destination designated by a user or a particular area.

That is, even though the moving robot is able to recognize the position thereof with reference to a charging base, if the moving robot is placed at a random position by a user or if the position of the moving robot in move is forcibly changed, it is hard for the moving robot to determine the current position.

In addition, the moving robot is able to determine the position by looking up the surroundings through an operation such as wall following, but this requires a number of trials and errors, leading to an unnecessary operation and prolonging a time for recognizing the position. In this case, due to the long unnecessary traveling, the battery may be consumed eve before the main cleaning operation and thus the moving robot may not be able to operate.

DISCLOSURE

Technical Problem

A moving robot of the present invention and a control method thereof aims to provide a moving robot and a control method, the moving robot which performs cleaning based on a map of an area and is able to determine the current position on the map no matter where the moving robot is positioned, so that the moving robot is capable of moving to a designated area based on the current position and performing cleaning.

Technical Solution

In one general aspect of the present invention, there is provided a moving robot comprising: a movable main body; a travel drive unit having a plurality of drive wheels to move the main body; an image acquisition unit configured to acquire images of surroundings; a storage configured to store acquisition images received through the image acquisition unit and a map of a travel area; and a controller configured to recognize a current position to control the travel drive unit and perform cleaning, wherein the controller is further configured to: when a cleaning command is received, determine whether a position on the map and the current position matches according to whether a position of the main body is changed; recover the current position; and move to a designated area in response to the cleaning command and perform cleaning.

The controller may be further configured to: when the position on the map and the current position do not match each other, extract features from the acquisition images received from the image acquisition unit; and based on the features, determine one of a plurality of areas included in the map to be the current position.

The controller may be further configured to: set a path from the current position to the designated area; and control the travel drive unit to move to the designated area and perform cleaning of the designated area.

The controller may be further configured to: when the designated area set to be a plurality of designated areas, determine whether a priority area is set; perform cleaning of the priority area; and perform leaning of other designated areas.

The controller may be further configured to, when the designated area is a plurality of designated areas, perform cleaning of the plurality of designated areas sequentially in a set order of cleaning.

The controller may be further configured to: when the designated area is a plurality of designated areas, move to a designated area close to the current position and perform cleaning; and perform cleaning according to ascending order of moving distance between the designated areas.

The controller may be further configured to: when the map is not stored in the storage, analyze the acquisition images acquired during traveling in the travel area; separate the travel area into a plurality of areas; and generate the map.

The controller may be further configured to transmit the map to an external terminal that inputs the cleaning command, and the external terminal may display the map on a screen, and inputs the cleaning command with respect to at least one of a plurality of areas included in the map.

The external terminal may transmit the cleaning command by setting at least one of the plurality of areas included in the map as the designated area.

The external terminal may set a new area as the designated area, irrespective of the plurality of areas included in the map, through a provided input means and transmits the cleaning command.

The controller may be further configured to transmit data on a position of the moving robot and a cleaning state to the external terminal, and the external terminal may display the position of the moving robot and the cleaning state on the map based on the data received from the moving robot.

The travel drive unit further comprises a switch which is installed on the drive wheels, and which is operated by a weight of the main body applied to the drive wheels, and the controller may be further configured to determine whether the main body is raised off a floor and thereby a position thereof is changed.

The controller may include: an area separation unit configured to separate the travel area into a plurality of small areas or a plurality of large areas by a predetermined criterion; and a recognition unit configured to extract at least one recognition feature from an image acquired at an unknown current position, calculate recognition descriptors respectively corresponding to the recognition features, and compute a feature distribution for each small area or large area and the recognition descriptor by a predetermined estimation rule, thereby determining any one area to which the main body belongs as the current position.

The area separation unit may be further configured to, by a predetermined criterion, separate the travel area into a plurality of large areas into which the plurality of small areas is grouped, and the recognition unit may be further configured to: determine a large area in which the current position is included, by computing a feature distribution for each large area and the recognition descriptor by a predetermined superordinate estimation rule; and determining a small area in which the current position is included, by computing a feature distribution for each small area among a plurality of small areas included in the determined large area and the recognition descriptor by the predetermined estimation rule.

In another general aspect of the present invention, there is provided a control method of a moving robot, including: based on a map of a travel area separated into a plurality of areas, set at least one of the plurality of areas as a designated area and receive a cleaning command; determine a current position in the plurality of areas on the map; after a determination as to whether the current position is changed, when the current position does not match a position on the map, recover the current position; set a moving path from the current position to the designated area and move to the designated area; and perform cleaning of the designated area.

In another general aspect of the present invention, there is provided a moving robot control system including: a moving robot comprising an acquisition unit for acquiring images of surroundings and configured to perform cleaning by moving in a travel area based on a map of the travel area separated into a plurality of areas; and an external terminal configured to store the map, and input a cleaning command to the moving robot by setting at least one of the plurality of areas as a designated area, wherein, when the cleaning command is received, the moving robot recovers the current position by determining whether a position of a main body is changed and determining whether a position on the map and the current position match each other, and performs cleaning by moving to the designated area in response to the cleaning command.

Advantageous Effects

A moving robot and a control method thereof according to the present invention enables the moving robot to accurately recognize the current position on the map and, even when a position of the moving robot is arbitrarily changed, recognize its position again, so that it is possible to prevent trials and errors occurring when the moving robot is not able to recognize the current position. Accordingly, the moving robot is able to perform cleaning by moving a designated area accurately on its own, and a cleaning time may be greatly reduced due to the accurate movement.

BEST MODE

Advantages and features of the present invention and a method of achieving the same will be clearly understood from embodiments described below in detail with reference to the accompanying drawings. However, the present invention is not limited to the following embodiments and may be implemented in various different forms, and the embodiments are provided merely for complete disclosure of the present invention and to fully convey the scope of the invention to those of ordinary skill in the art to which the present invention pertains, and the present invention is defined only by the scope of the claims. Throughout the specification, like numbers refer to like elements. Hereinafter, a moving robot may be implemented by one or more processors or by a hardware device.

Hereinafter, embodiments of the present invention are described in detail with reference to accompanying drawings.

Figure 1:
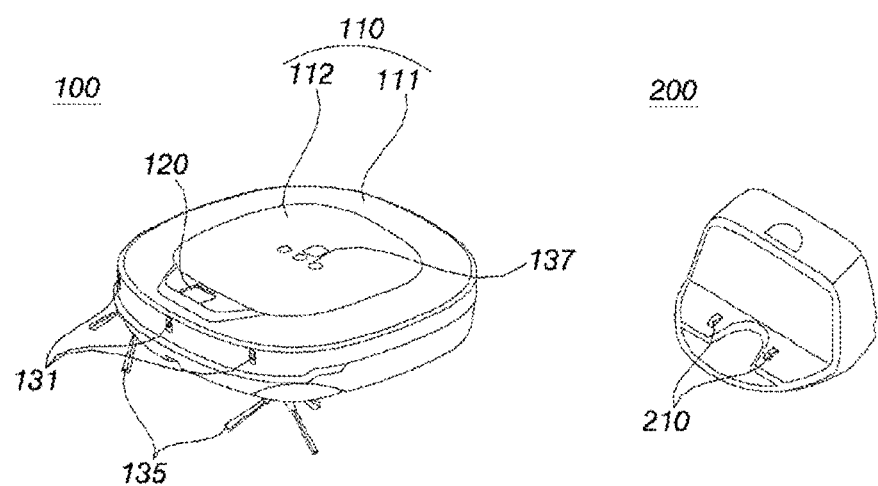
FIG. 1 is a perspective view of a moving robot and a charging base for charging the moving robot according to an embodiment of the present invention.
Figure 2:
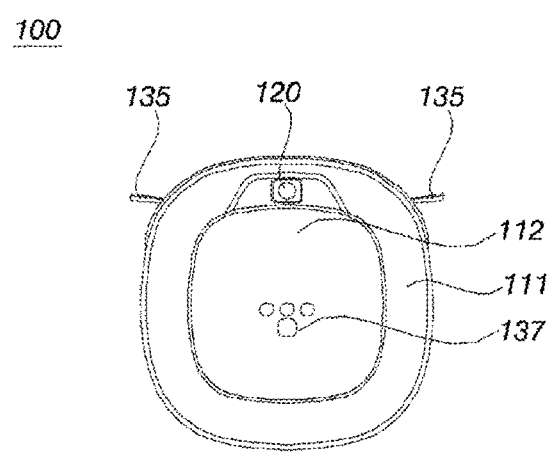
FIG. 2 is a view of a top part of the moving robot illustrated in FIG. 1.
Figure 3:
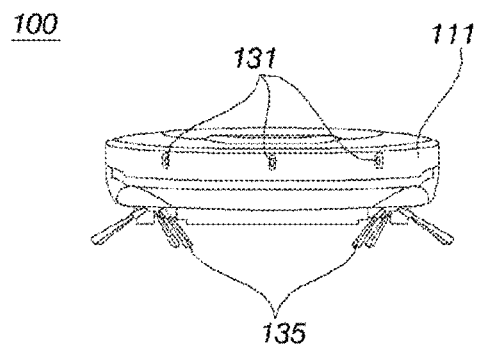
FIG. 3 is a view of a front part of the moving robot illustrated in FIG. 1.
Figure 4:
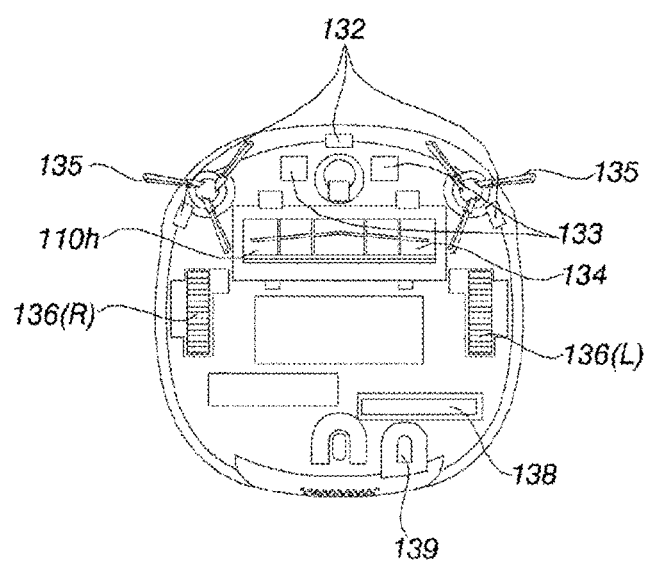
FIG. 4 is a view of a bottom part of the moving robot illustrated in FIG. 1.

FIG. 1 is a perspective view of a moving robot and a charging base for charging the moving robot according to an embodiment of the present invention, FIG. 2 is a view of a top part of the moving robot illustrated in FIG. 1, FIG. 3 is a view of a front part of the moving robot illustrated in FIG. 1, and FIG. 4 is a view of a bottom part of the moving robot illustrated in FIG. 1.

As illustrated in FIGS. 1 to 4, a moving robot 100 includes a main body 110 and an image acquisition unit 120 for acquiring images of the surroundings of the main body 110. Hereinafter, when it comes to defining each portion of the main part 110, a portion facing a ceiling in a travel area is defined as a top part (see FIG. 2), a portion facing a floor in the travel area is defined as a bottom part (see FIG. 4), and a portion facing a direction of travel in parts constituting the circumference of the main body 110 between the top part and the bottom part is referred to as a front part (see FIG. 3).

The moving robot 100 includes a travel drive unit 160 for moving the main body 110. The travel drive unit 160 includes at least one drive wheel 136 for moving the main body 110. The travel drive unit 160 may include a driving motor (not illustrated) connected to the drive wheel 136 to rotate the drive wheel. Drive wheels 136 may be provided on the left side and the right side of the main body 110, respectively, and such drive wheels 136 are hereinafter referred to as a left wheel 136(L) and a right wheel 136(R), respectively.

The left wheel 136(L) and the right wheel 136(R) may be driven by one driving motor, but, if necessary, a left wheel drive motor to drive the left wheel 136(L) and a right wheel drive motor to drive the right wheel 136(R) may be provided. The travel direction of the main body 110 may be changed to the left or to the right by making the left wheel 136(L) and the right wheel 136(R) have different rates of rotation.

In addition, the travel drive unit 160 includes a switch installed at a drive wheel. The switch may be installed on one side of the drive wheel, and serves to, when the main body 110 is positioned on a floor, operate by a weight applied by the main body to the drive wheel and transmit a detection signal to a controller. Meanwhile, when the main body is raised to come off the floor, the weight applied to the drive wheel is reduced and accordingly the switch is turned off and transmits a signal to the controller. However, the on/off state of the switch may be changed.

A suction port 110h to suction air may be formed on the bottom part of the main body 110, and the main body 110 may be provided with a suction device (not illustrated) to provide suction force to cause air to be suctioned through the suction port 110h, and a dust container (not illustrated) to collect dust suctioned together with air through the suction port 110h.

The main body 110 may include a case 111 defining a space to accommodate various components constituting the moving robot 100. An opening allowing insertion and retrieval of the dust container therethrough may be formed on the case 111, and a dust container cover 112 to open and close the opening may be provided rotatably to the case 111.

There may be provided a roll-type main brush having bristles exposed through the suction port 110h and an auxiliary brush 135 positioned at the front of the bottom part of the main body 110 and having bristles forming a plurality of radially extending blades. Dust is separated from the floor in a travel area by rotation of the brushes 134 and 135, and such dust separated from the floor in this way is suctioned through the suction port 110h and collected in the dust container.

A battery 138 serves to supply power not only necessary for the drive motor but also for overall operations of the moving robot 100. When the battery 138 of the moving robot 100 is run out, the moving 100 may perform return travel to the charging base 200 to charge the battery, and during the return travel, the moving robot 100 may autonomously detect the position of the charging base 200.

The charging base 200 may include a signal transmitting unit (not illustrated) to transmit a predetermined return signal. The return signal may include, but is not limited to, a ultrasonic signal or an infrared signal.

The moving robot 100 may include a signal sensing unit (not shown) to receive the return signal. The charging base 200 may transmit an infrared signal through the signal transmitting unit, and the signal sensing unit may include an infrared sensor to sense an infrared signal. The moving robot 100 moves to the position of the charging base 200 according to the infrared signal transmitted from the charging base 200 and docks with the charging base 200. By docking, charging of the moving robot 100 is performed between a charging terminal 133 of the moving robot 100 and a charging terminal 210 of the charging base 200.

The image acquisition unit 120, which is configured to photograph the travel area, may include a digital camera. The digital camera may include at least one optical lens, an image sensor (e.g., a CMOS image sensor) including a plurality of photodiodes (e.g., pixels) on which an image is created by light transmitted through the optical lens, and a digital signal processor (DSP) to construct an image based on signals output from the photodiodes. The DSP may produce not only a still image, but also a video consisting of frames constituting still images.

Preferably, the image acquisition unit 120 is provided to the top part of the main body 110 to acquire an image of the ceiling in the travel area, but the position and capture range of the image acquisition unit 120 are not limited thereto. For example, the image acquisition unit 120 may be arranged to acquire a forward image of the main body 110.

In addition, the moving robot 100 may further include an obstacle sensor to detect a forward obstacle. The moving robot 100 may further include a sheer drop sensor 132 to detect presence of a sheer drop on the floor within the travel area, and a lower camera sensor 139 to acquire an image of the floor.

In addition, the moving robot 100 includes a manipulation unit 137 to input an on/off command or any other various commands. Through the operator 137, a variety of control commends necessary for overall operations of the moving robot 100 may be received. In addition, the moving robot 100 may include an output unit (not illustrated) to display reservation information, a battery state, an operation mode, an operation state, an error state, etc.

Figure 5:
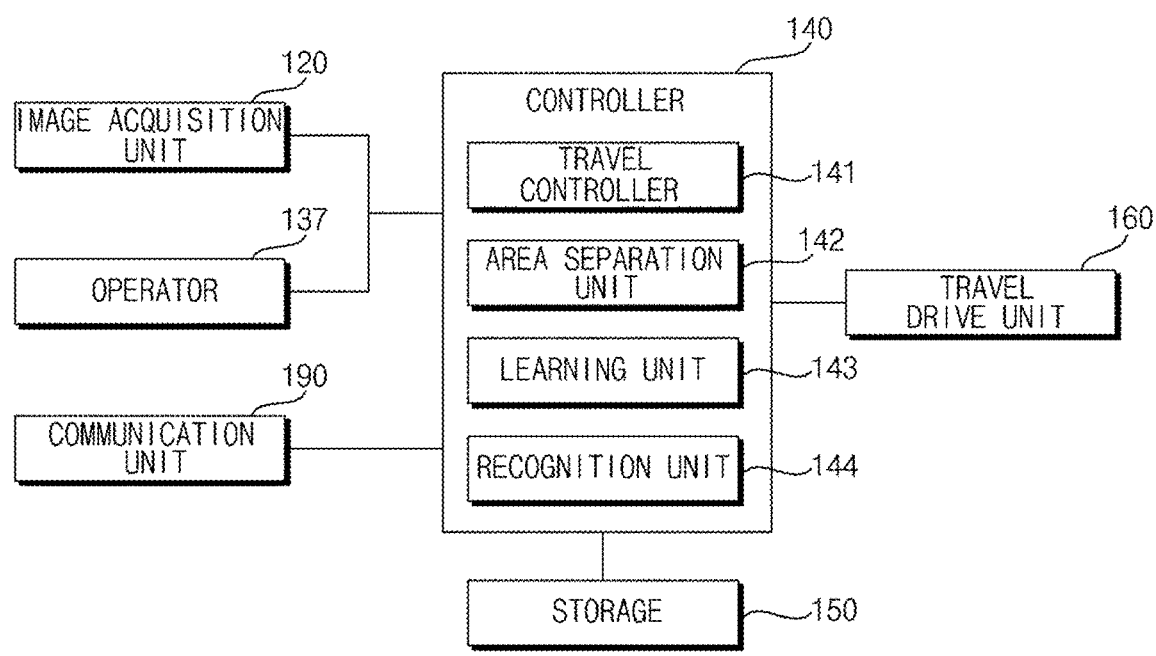
FIG. 5 is a block diagram illustrating a control relationship between major components of a moving robot according to an embodiment of the present invention.

FIG. 5 is a block diagram illustrating a control relationship between major components of a moving robot according to an embodiment of the present invention.

Referring to FIG. 5, the moving robot 100 may include a controller 140 for processing and determining a variety of information, such as recognizing the current position, and a storage 150 for storing a variety of data. In addition, the moving robot 100 may further include a communication unit 190 to transmit and receive data with respect to an external terminal. As the controller is included, each unit of the moving robot may be implemented by one or more processors or may be implemented by a hardware device.

The external terminal may include an application for controlling the moving robot 100, displays a map of a travel area to be cleaned by executing the application, and designate a particular area on a map to be cleaned. Examples of the external terminal may include a remote control, a PDA, a laptop, a smartphone, a tablet, and the like in which an application for configuring a map is installed.

By communicating with the moving robot 100, the external terminal may display the current position of the moving robot in addition to the map, and display information on a plurality of areas. In addition, the external terminal may update the current position in accordance with traveling of the moving robot and displays the updated current position.

The controller 140 controls the image acquisition unit 120, the operator 137, and the travel drive unit 160 of the moving robot 100 so as to control overall operations of the moving robot 100.

The area separation unit 142 may separate the travel area X into a plurality of areas completely separated from each other by a moving line. For example, two indoor spaces completely separated from each other by a moving line may be separated as two areas. In another example, even in the same indoor space, the areas may be separated on the basis of floors in the travel area X.

In addition, a map of a travel area may be stored in the storage 150. The map may be input by an external terminal capable of exchanging information with the moving robot 100 through wired or wireless communication, and may be generated by the moving robot 100 through self-learning.

On the map, positions of rooms in the travel area may be displayed. In addition, the current position of the moving robot 100 may be displayed on the map, and the current position of the moving robot 100 may be updated during traveling. The external terminal stores a map identical to a map stored in the storage 150.

The controller 140 includes a travel controller 141, an area separation unit 142, a learning unit 143, and a recognition unit 144.

The travel controller 141 serves to control traveling of the moving robot 100, and controls driving of the travel drive unit 160 according to a travel setting. In addition, the travel controller 141 may recognize a moving path of the moving robot 100 based on operation of the travel drive unit 160. For example, the travel controller 141 may identify a current or previous moving speed, a distance traveled, etc. of the moving robot 100 based on a rotation speed of a driving wheel 136, and may also recognize a current or previous switch of direction in accordance with a direction of rotation of each drive wheel 136(L) or 136(R). Based on travel information of the moving robot 100, which is recognized in the above manner, a position of the moving robot 100 may be updated on the map.

In addition, in accordance with a signal received from the switch provided in the drive wheel, the travel controller 141 determines whether the main body 110 is on a floor or whether the main body 110 is raised off the floor. When the raised main body returns back to the floor, the travel controller 141 may control the recognition unit to recognize the current position.

The area separation unit 142 may separate a travel area into a plurality of areas by a predetermined criterion. The travel area may be defined as a range including areas of every plan previously traveled by the moving robot 100 and areas of a plan currently traveled by the moving robot 100.

The area separation unit 142 may separate the travel area into a plurality of small areas, and the small areas may be distinguished on the basis of chambers (rooms) in the travel area. In addition, the area separation unit 142 may separate the travel area into a plurality of large areas separated by a travel capability. For example, even on the same plane, two indoor spaces separated by a moving path may be distinguished as two large areas. In another example, even in the same indoor space, the large areas may be distinguished on the basis of floors in the travel area.

The learning unit 143 may generate a map of a travel area. In addition, the learning unit 143 perform global localization by processing an image acquired at each position by the image acquisition unit 120 and associating the image with the map. Each position of the main body may be stored as a node on the map.

The learning unit 143 matches an image acquired at each position with a corresponding node on the map. Acquisition images may correspond to nodes, respectively.

The learning unit 143 may generate a map based on nodes N and a travel constraint between the nodes.

The learning unit 143 generates information on a node on a map based on travel constraint information. For example, node coordinate information may be generated based on a travel constraint measured with reference to an origin point. Node information may include the node coordinate information. The node information may include information on an acquisition image corresponding to the node.

In addition, the learning unit 143 may update a pre-generated map. The learning unit 143 may update pre-stored node coordinate information through continuous traveling. The learning unit 143 may update pre-stored information on an acquisition image corresponding to a node through the continuous traveling.

A method for recognizing the current position based on travel information is implementable on the premise of continuous traveling of the moving robot 100, and, when a position jumping event occurs, it is not possible to recognize the current position based on the travel information.

The position jumping event indicates a situation in which the moving robot moves when tracking a moving path on a map is not allowed. Specifically, the position jumping event may occur when the moving robot moves in the case where measuring a travel constraint is not allowed.

Examples of the position jumping event include a kidnapping event in which the moving robot in move is forcibly picked up by a user and placed somewhere, or an event in which the moving robot turned off is forcibly placed somewhere. In addition, when the dust container is separated from the main body to clean the dust container, a position of the main body is changed.

The recognition unit 144 estimates and recognizes the current position. By recognizing the current position in association with the learning unit 143 based on image information of the image acquisition unit 120, the recognition unit 144 is enabled to estimate and recognize the current position even when the position of the moving robot 100 is changed unexpectedly.

The moving robot 100 is enabled to recognize a position thereof using the area separation unit 142 during continuous traveling, and to learn a map and estimate the current position using the learning unit 143 and the recognition unit 144 even without the area separation unit 142. The recognition unit 144 recognizes the current position of the moving robot based on image information upon a position jumping event.

While the moving robot 100 travels, the image acquisition unit 120 acquire images of the surroundings of the moving robot 100. Hereinafter, an image acquired by the image acquisition unit 120 is defined as an "acquisition image". The acquisition image includes various features located at a ceiling such as lighting devices, edges, corners, blobs, and ridges.

The learning unit 143 detects features from each acquisition image. In computer vision, there are a variety of well-known techniques for detecting features from an image. A variety of feature detectors suitable for such feature detection are well known. For example, there are Canny, Sobel, Harris & Stephens/Plessey, SUSAN, Shi & Tomasi, Level curve curvature, FAST, Laplacian of Gaussian, Difference of Gaussians, Determinant of Hessian, MSER, PCBR, and Grey-level blobs detectors.

The learning unit 143 calculates a descriptor based on each feature. For feature detection, the learning unit 143 may convert a feature into a descriptor using Scale Invariant Feature Transform (SIFT). The descriptor may be expressed as an n-dimensional vector.

The SIFT may detect a feature invariant to scale, rotation, and a change in brightness of a subject, and accordingly, it is possible to detect an invariant (that is, rotation invariant) feature when the same area is imaged by changing the position of the moving robot 100. Of course, aspects of the present invention are not limited thereto, and other various techniques (e.g., Histogram of Oriented Gradient (HOG), Haar feature, Fems, Local Binary Pattern (LBP), and Modified Census Transform (MCT)) may be applied.

Based on descriptor information acquired from an acquired image acquired at each location, the learning unit 143 may classify at least one descriptor of the acquired image into a plurality of groups by a predetermined subordinate classification rule, and convert descriptors included in the same group into subordinate representative descriptors by a predetermined subordinate representation rule.

In another example, the learning unit 143 may classify all descriptors calculated based on images acquired in a predetermined area into a plurality of groups by the predetermined subordinate classification rule, and convert subordinate descriptors included in the same group into subordinate representative descriptors by the predetermined subordinate representation rule.

Through the above procedure, the learning unit 143 may obtain a feature distribution for each position. The feature distribution of each position may be represented by a histogram or an n-dimensional vector. In another example, without using the predetermined subordinate classification rule and the predetermined subordinate representation rule, the learning unit 143 may estimate an unknown current position based on a descriptor calculated from each feature.

In addition, when the current position of the moving robot 100 has become unknown due to position jumping, the learning unit 143 may estimate the current position of the moving robot 100 based on data such as a pre-stored descriptor and a subordinate representative descriptor.

The moving robot 100 acquires an acquisition unit image at the unknown current location using the image acquisition unit 120. Various features located at a ceiling, such as lighting devices, edges, corners, blobs, and ridges, are found in the acquisition image.

The recognition unit 144 detects features from the acquisition unit. Descriptions about various methods for detecting features from an image in computer vision and various feature detectors suitable for feature detection are the same as described above.

The recognition unit 144 calculates a recognition descriptor based on each recognition feature through a recognition descriptor calculating process (S31). In this case, the recognition feature and the recognition descriptor are used to describe a process performed by the recognition unit 144, and to be distinguishable from the terms describing the process performed by the learning unit 143. However, these are merely terms defined to describe characteristics of a world outside the moving robot 100.

For such feature detection, the recognition unit 144 may convert a recognition feature into a recognition descriptor using the SIFT technique. The recognition descriptor may be represented by an an-dimensional vector.

The SIFT is an image recognition technique by which easily distinguishable features, such as corners, are selected in an acquisition image and n-dimensional vectors are obtained, which are values of dimensions indicative of a degree of radicalness of change in each direction with respect to a distribution feature (a direction of brightness change and a degree of radicalness of the change) of gradient of pixels included in a predetermined area around each of the features.

Based on information on at least one recognition descriptor obtained from an acquisition image acquired at an unknown current position, the recognition unit 144 performs conversion by a predetermined subordinate conversion rule into information (a subordinate recognition feature distribution) comparable with position information (e.g., a subordinate feature distribution for each position) which is a comparison subject.

By a predetermined subordinate comparison rule, a feature distribution for each position may be compared with a corresponding recognition feature distribution to calculate a similarity therebetween. A similarity (probability) for the position corresponding to each position, and a position having the highest probability may be determined to be the current position.

As such, the controller 140 may generate a map of a travel area consisting of a plurality of areas, or recognize the current position of the main body 110 based on a pre-stored map.

When the map is generated, the controller 140 transmits the map to an external terminal through the communication unit 190. In addition, as described above, when a map is received from the external terminal, the controller 140 may store the map in the storage.

In addition, when the map is updated during traveling, the controller 140 may transmit update information to the external terminal so that the map stored in the external terminal is identical to the map stored in the moving robot 100. As the identical map is stored in the external terminal and the moving robot 100, the moving robot 100 may clean a designated area in response to a cleaning command from a mobile terminal, and the current position of the moving robot may be displayed in the external terminal.

In this case, the map shows a cleaning area separated into a plurality of areas, includes a connection channel connecting the plurality of areas, and includes information on an obstacle in an area. Separation of the cleaning area may be performed by the area separation unit 142 into small areas and large areas.

When a cleaning command is received, the controller 140 determines whether a position on the map and the current position of the moving robot match each other. The cleaning command may be received from a remote controller, an operator, or the external terminal.

For example, if the main body is picked up by a user and thus a position thereof is changed, if the main body is turned off and then turned on again, and if a dust container is separated and then installed again, the current position is checked again. In addition, since there may be an error in the position due to slipping of the moving robot during traveling, the current position is checked.

In addition, the controller 140 may determine a change of a position of the main body in accordance with a signal from the switch installed on the drive wheel. When the main body is positioned on a floor, the switch installed on the drive wheel is pressed and thus turned on, and, when the main body is raised off the floor, the switch is turned off. When the switch signal changes from the on-state to off-state and then back to the on-state, the controller 140 checks the current position.

When the current position does not match with a position on the map, or when it is not possible to check the current position, the controller 140 recognizes the current position, recovers the current position of the moving robot 100 and then controls the travel drive unit to move to a designated area based on the current position.

When the current position does not match with a position on the map or when it is not possible to check the current position, the recognition unit 144 analyzes an acquisition image received from the image acquisition unit 120 and estimate the current position based on the map. In addition, the area separation unit 142 or the learning unit 143 may recognize the current position as described above.

The recognition unit estimates position by comparing and associating feature data, extracted through analysis of an acquisition image, with data on a map pre-generated by the learning unit, and analyzing correlation therebetween.

In a position jumping event, a position may be changed in the same large area, a position may be changed to another large area not connected by a moving path, or a position may be changed to a new area not including a map.

Even in the case of movement in one area or movement between different large areas, if a pre-stored map exists, the recognition unit estimates the current position based on an acquisition image and the map. Meanwhile, if there is no map corresponding to the current position because of movement to a new area, the controller may recognize the current position by generating a new map based on the current position through the area separation unit and the learning unit.

After the current position of the moving robot 100 is recovered by recognizing the position, the travel controller 141 may calculate a moving path from the current position to a designated area and controls the travel drive unit 160 to move to the designated area.

If at least one area is selected by an external terminal from among a plurality of areas, the travel controller 141 may set the selected area as a designated area and calculates a moving path. The travel controller 141 performs cleaning after movement to the designated area.

Meanwhile, if a plurality of areas is selected as a designated area, the travel controller 141 may determine whether a priority area is set among the plurality of areas or if an order of cleaning of the plurality of selected designated areas is set, and then moves to a designated area and perform cleaning.

If one of the plurality of designated areas is set as a priority area, the travel controller 141 moves to the priority area among the plurality of designated areas to clean the priority area first, and then moves to other designated areas to perform cleaning. In addition, if the order of cleaning of the designated areas is set, the travel controller 141 may perform cleaning by sequentially moves according to the order of cleaning.

In addition, if a new random area is set irrespective of separation of the plurality of areas on the map, the travel controller 141 may move to the set designated area to perform cleaning.

When cleaning of the set designated area is completed, the controller 140 may store a cleaning record in the storage 150.

In addition, the controller 140 may transmit an operation state or a cleaning state of the moving robot 100 to an external terminal 50 through the communication unit 190 in a predetermined period. Accordingly, based on received data, the external terminal 50 may display a position of the moving robot along with a map on a screen of an application in execution, and outputs information on a cleaning state.

Figure 6:
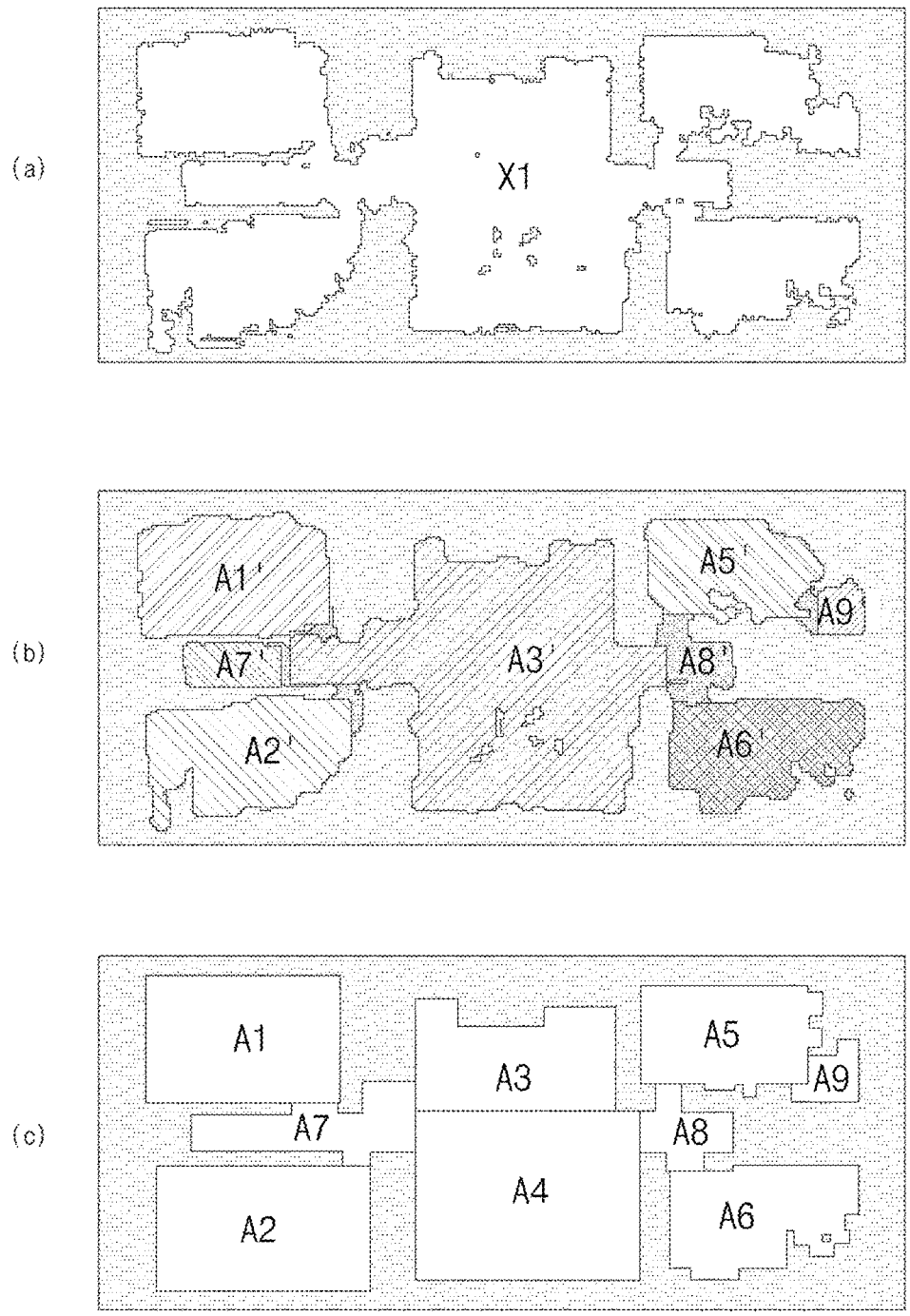
FIG. 6 is a diagram illustrating an example of area separation by a moving robot according to the present invention, and a map generated accordingly.

FIG. 6 is a diagram illustrating an example of area separation by a moving robot according to the present invention, and a map generated accordingly.

As illustrated in (a) of FIG. 6, when there is no pre-stored map, the moving robot 100 may generate a map by traveling a travel area X1 through wall following.

The area separation unit 142 may separate the travel area X1 into a plurality of areas A1' to A9', as illustrated in (b) of FIG. 6, and generate a map, as illustrated in (c) of FIG. 6. The generated map is stored in the storage 150, and transmitted to the external terminal 50 through the communication unit 190. The area separation unit 142 may separate the travel area X1 into small areas and large areas, as described above, and generates a map accordingly.

The external terminal 50 executes an application and displays a received map on a screen. In this case, the plurality of areas A1 to A9 may be differently displayed. The plurality of areas A1 to A9 on the map may be displayed with different colors or different names.

When a cleaning command is received, the moving robot 100 determines the current position based on the stored map: if the current position and a position on the map match each other, the moving robot performs designated cleaning and, if not, the moving robot recognizes and recovers the current position and then perform cleaning. Thus, no matter where the moving robot 100 is positioned in any of the plurality of areas A1 to A9, the moving robot 100 may be able to determine the current position, move to a designated area, and perform cleaning.

Figure 7A:
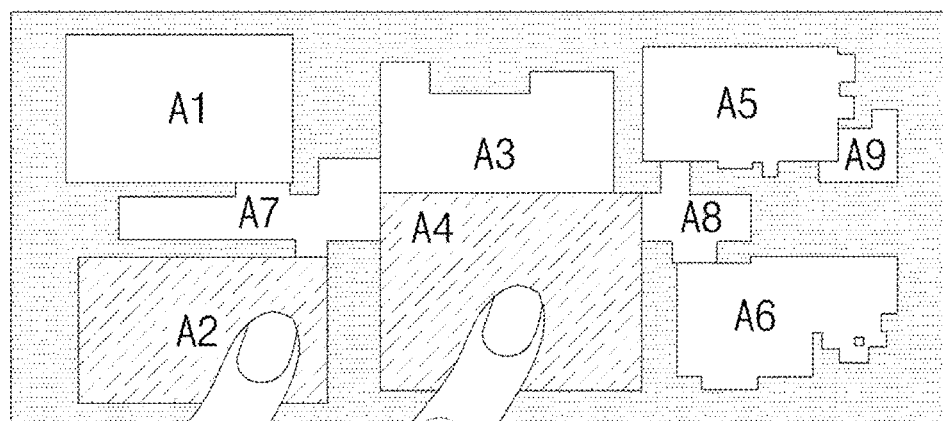
FIGS. 7A and 7B are diagrams illustrating an example of designating a cleaning area using a map of a moving robot of the present invention.
Figure 7A:
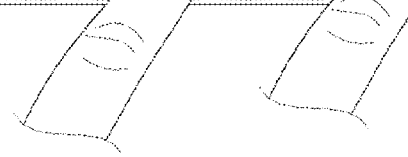
Figure 7A:
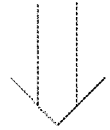
Figure 7A:
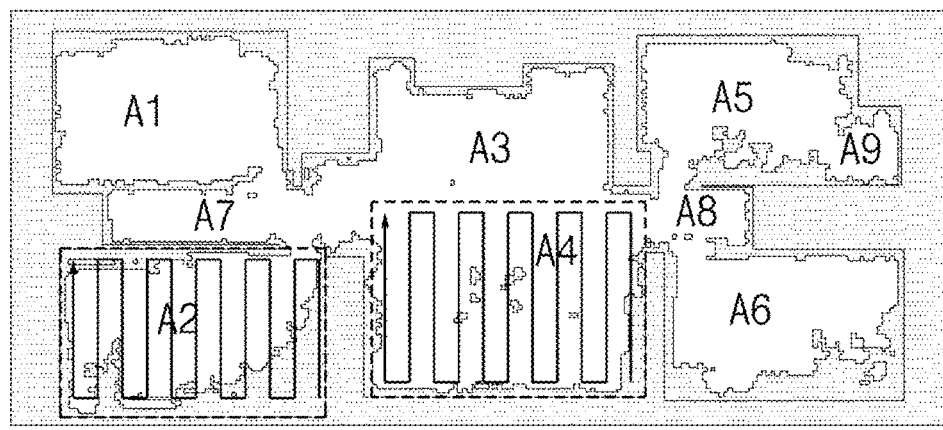
Figure 7B:
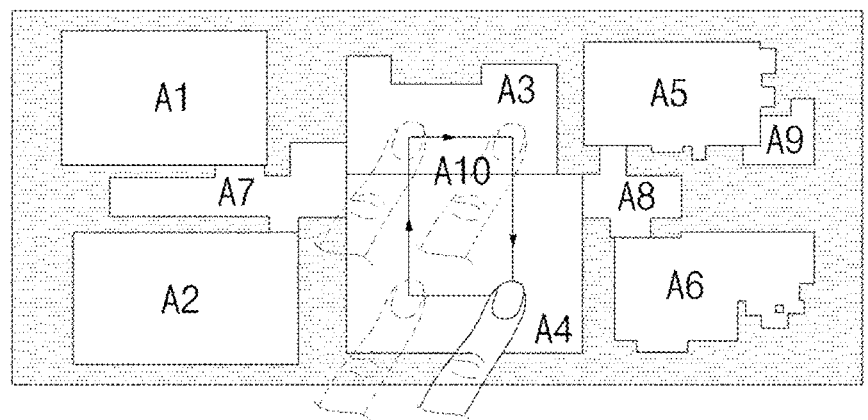
Figure 7B:
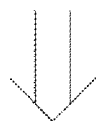
Figure 7B:
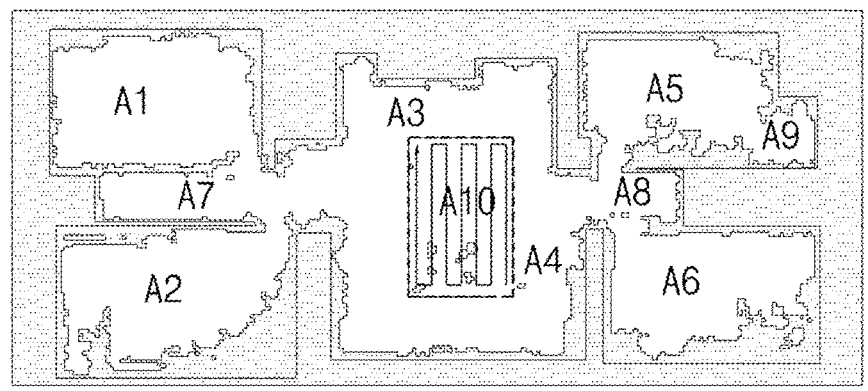

FIGS. 7A and 7B are diagrams illustrating an example of designating a cleaning area using a map of a moving robot of the present invention.

As illustrated in FIG. 7A, the external terminal 50 may select at least one of the plurality of areas A1 to A9, and inputs a cleaning command to the moving robot 100.

For example, the external terminal 50 selects a second area A2 and a fourth area A4 and inputs a cleaning command to the moving robot 100. In this case, the external terminal 50 may set one of the second area and the fourth area as a priority area, or may set an order of cleaning. For example, the external terminal 50 may set an order of cleaning according to a touch order.

When the second area A2 and the fourth area A4 are selected, the moving robot 100 may move to the second area A2 and the fourth area A4 and perform cleaning thereof.

When the second area A2 is set as a priority area among the second area A2 and the fourth area A4, the moving robot 100 may move to the second area A2 and perform cleaning of the second area, and then move to the fourth area and perform cleaning of the fourth area. If an order of cleaning is not set with respect to designated areas other than the priority area, a plurality of designated areas may be cleaned in ascending order of closeness to the current position.

When the order of cleaning of the plurality of designated areas is set, the moving robot 100 performs cleaning in the set order.

When a priority area or an order of cleaning is not set after reception of a cleaning command for the second area A2 and the fourth area A4, the moving robot 100 moves to an area close to the current position and performs cleaning.

The external terminal 50 outputs, on a screen, a cleaning state of each travel area based on received data. The external terminal 50 may display a cleaning complete area and a cleaning ongoing area in different manners.

As illustrated in FIG. 7B, the external terminal 50 may set a new tenth area A10, irrespective of the plurality of areas A1 to A9 displayed on the map, and input a cleaning command.

The external terminal 50 may set a new area by applying a touch input or a dragging input to a travel area displayed on a map using an input means, such as a touch pad, a touch screen, etc. The new area is exemplarily illustrated as a square, but may be set as a circle or a triangle, and the shape of the new area may be not limited but may be set freely according to a touched or dragged shape.

The external terminal 50 may set a part of one area out of the plurality of area as a new area, and may set a part of two or more areas as a new area. For example, the tenth area may include a part of the third area and the fourth area.

When a new area is set by the external terminal as a designated area and a cleaning command thereof is input, the moving robot 100 may move to the tenth area A10, which is the designated area, and perform cleaning of the tenth area 10.

The external terminal 50 displays a state of cleaning the tenth area based on data received from the moving robot 100.

Figure 8:
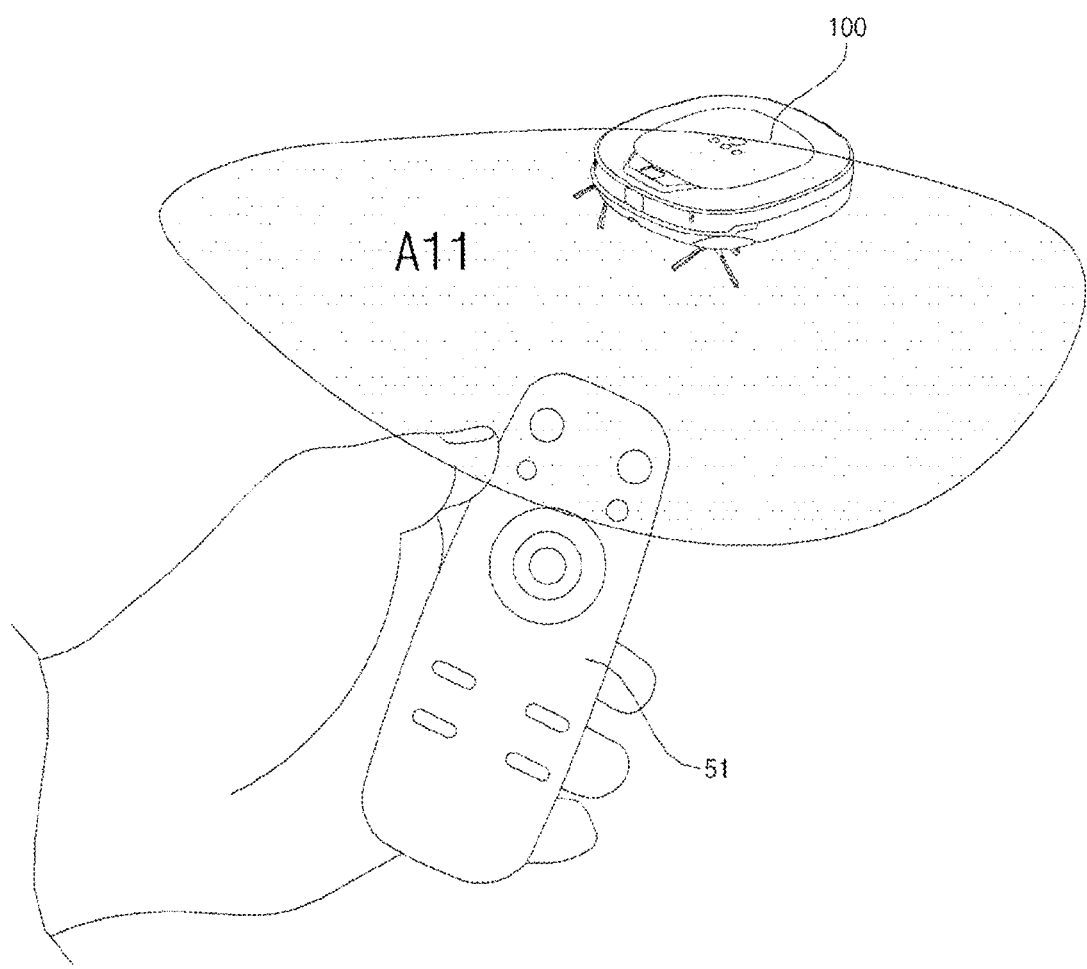
FIG. 8 is a diagram illustrating an example of a method for designating an area on a map of a moving robot of the present invention.

FIG. 8 is a diagram illustrating an example of a method for designating an area on a map of a moving robot of the present invention.

As illustrated in FIG. 8, the external terminal 50 may set an eleventh area A11, which is a new area, as a designated area according to a motion of the external terminal 50 by use of a sensor provided in the external terminal 50. In this case, a remote controller 51 may be used as the external terminal.

The external terminal 50 may set the new area according to a gradient and a motion of the external terminal with reference to the current position of the external terminal on the map. The external terminal 50 may display the eleventh area A11 on the map, set the eleventh area A11 as a designated area, and transmits a cleaning command for the eleventh area to the moving robot 100.

In addition, when a predetermined signal is transmitted in response to a motion of the external terminal 50, the moving robot 100 may perform cleaning by recognizing the eleventh area A11 in response to the transmitted signal.

Figure 9:
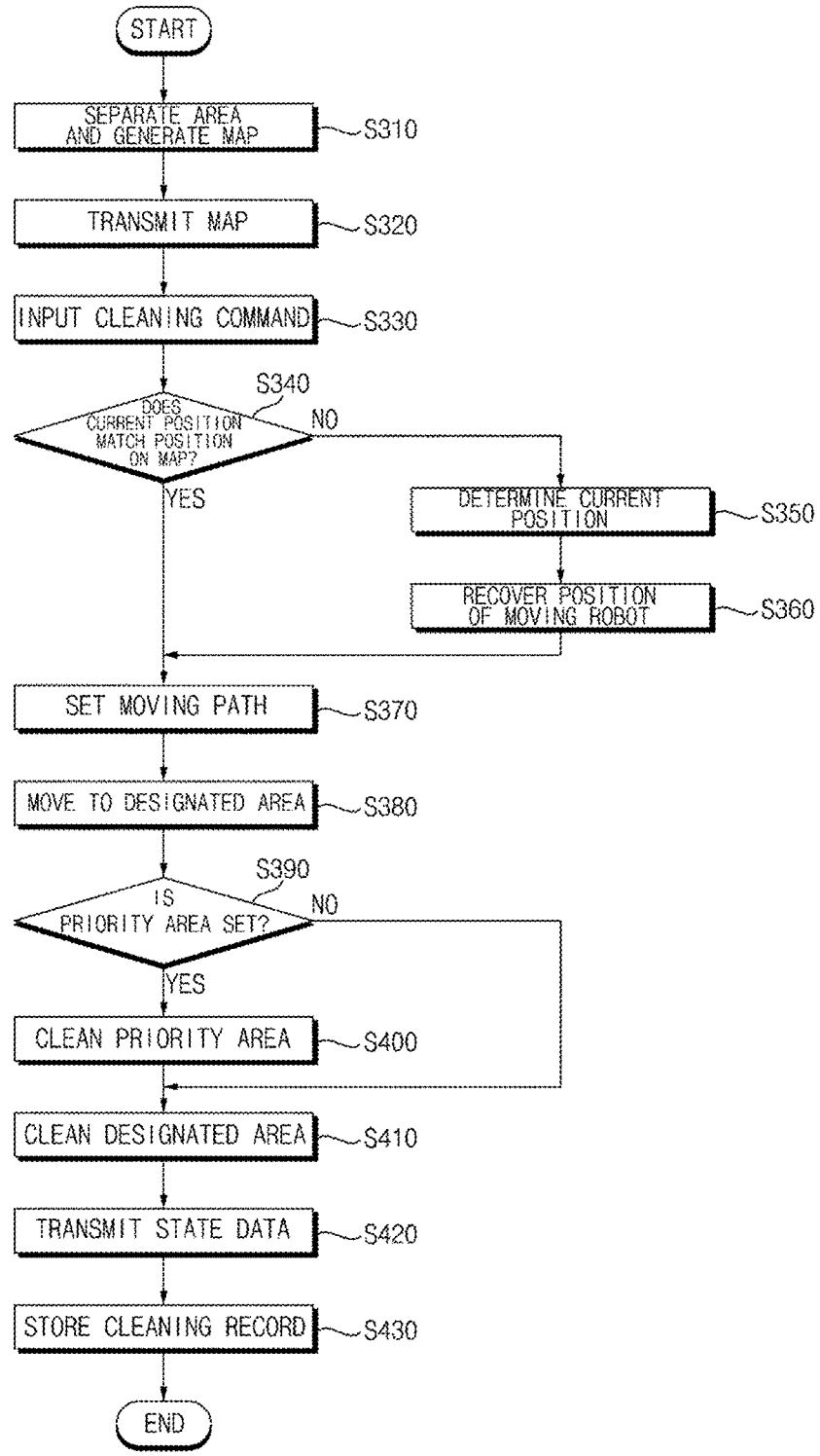
FIG. 9 is a flowchart illustrating a control method for cleaning a designated area by a moving robot of the present invention.

FIG. 9 is a flowchart illustrating a control method for cleaning a designated area by a moving robot of the present invention.

As illustrated in FIG. 9, when no map is stored, the moving robot 100 may travel in a travel area and separate the area based on a distance travelled and acquisition images acquired by the image acquisition unit so as to generate a map (S310).

The generated map is stored in the storage 150, and transmitted to the external terminal 50 through the communication unit 190 (S320). The external terminal 50 may display the received map on a screen.

When a cleaning command is received (S330), the external terminal 50 or the operator 137 may determine whether the current position and a position on the map match each other. The moving robot 100 may compare the position on the stored map and the actual current position of the moving robot 100 to determine whether the position on the stored map and the actual current position match each other.

Using at least one of the area separation unit 142, the learning unit 143, or the recognition unit 144, the moving robot 100 may determine whether the positions match each other.

In this case, if the current position and the position on the map do not match each other, the current position is determined using at least one of the area separation unit 142, the learning unit 143, or the recognition unit 144 (S350), and a position of the moving robot is recovered (S360).

If the current position and the position on the map match each other, the travel controller 141 sets a moving path from the current position to an area which is designated by a cleaning command (S370). The travel controller 141 may control the travel drive unit 160 so that the moving robot 100 moves along the set moving path (S380).

When a plurality of areas is designated by a cleaning command, the travel controller 141 may determine whether a priority area is set among the designated areas (S390). The travel controller 141 moves to the priority area among the plurality of designated areas and performs cleaning thereof (S400).

Meanwhile, when a priority area is not set, the travel controller 141 may move to an area which is close to the current position among the plurality of designated areas.

When an obstacle is detected during traveling, the travel controller 141 travels by modifying the moving path so as to avoid the obstacle.

In addition, when the order of cleaning the plurality of designated areas is set, the travel controller 141 may perform cleaning by sequentially moving to the plurality of designated areas according to the order of cleaning.

The moving robot 100 performs cleaning of a designated area (S410), and transmits state data on a cleaning data and a position of the moving robot to the external terminal 50 during cleaning (S420). Accordingly, the external terminal 50 displays the current position of the moving robot 100 and the cleaning state on a screen. The external terminal 50 may display a cleaning complete area and a cleaning ongoing area in a distinguishable manner.

When the cleaning is completed, the moving robot 100 stores a cleaning record in the storage 150 (S430), and transmits data on completion of cleaning to the external terminal 50.

Figure 10:
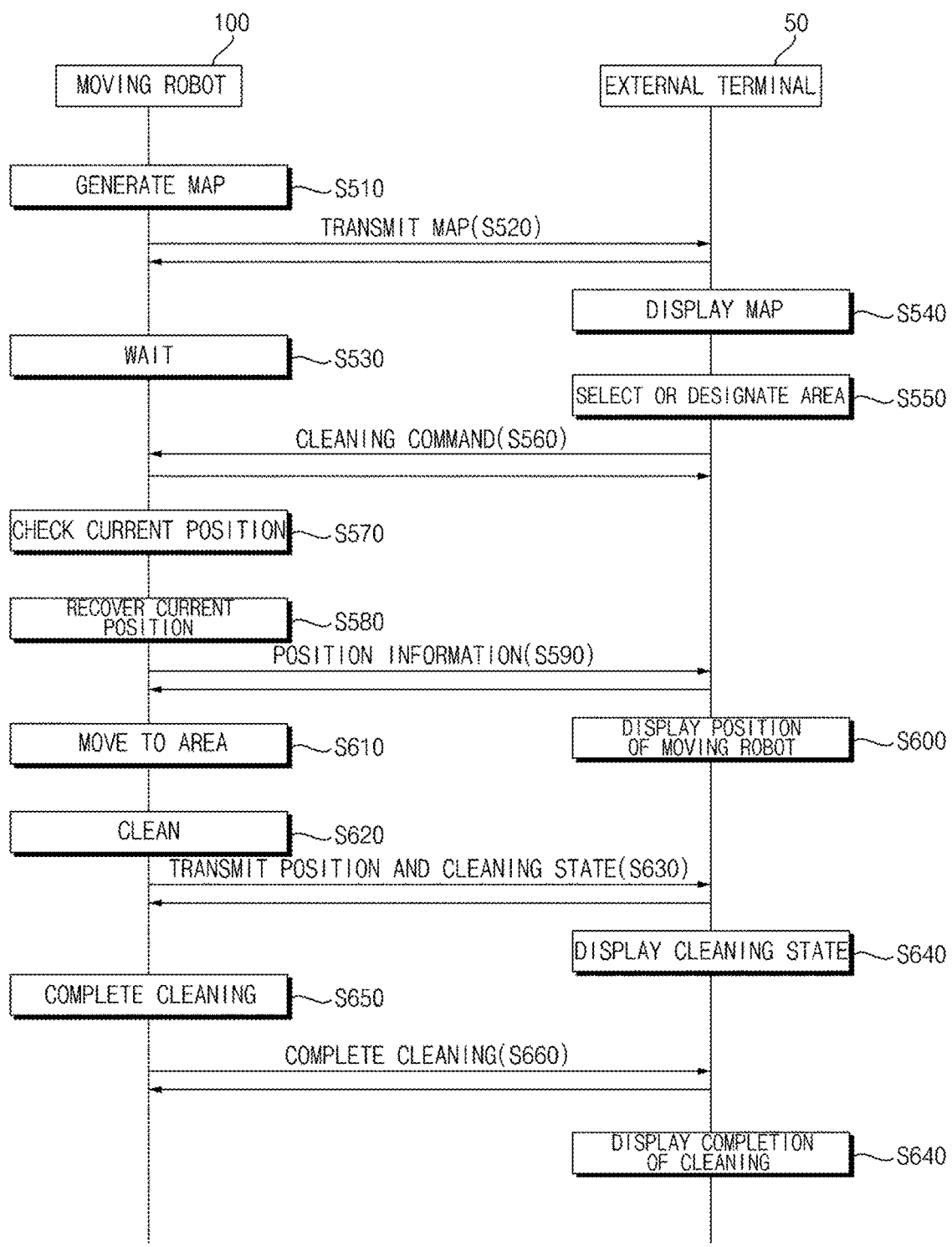
FIG. 10 is a flowchart illustrating a signal flow between a moving robot of the present invention and an external terminal.

FIG. 10 is a flowchart illustrating a signal flow between a moving robot of the present invention and an external terminal.

As illustrated in FIG. 10, when the moving robot 100 generates a map (S510), the moving robot 100 transmits the generated map to the external terminal 50 (S520). The moving robot 100 waits until a cleaning command is received (S530).

The external terminal 50 executes an application to control cleaning of the moving robot, and displays the received map (S540). The external terminal 50 may select any one area on the map or designate a new area using an input means provided therein (S550). The external terminal 50 transmits a cleaning command for a designated area to the moving robot 100 (S560).

When the cleaning command is received, the moving robot 100 checks the current position (S570), determines whether the current position matches with a position on the map, recovers the current position (S580), and set a moving path to the designated area.

When the moving robot 100 recovers the current position, the moving robot 100 transmits position information on the current position of the moving robot 100 to the external terminal 50 (S590). The external terminal 50 displays the position of the moving robot 100 on the map based on received data (S600).

After restoring the current position, the moving robot 100 moves to the designated area along the set moving path (S610).

The moving robot 100 performs cleaning by traveling in one designated area or two or more designated areas (S620). When a plurality of designated areas is selected, the moving robot 100 performs cleaning while moving to a priority area or moving in an order of cleaning, and, when the priority area or the order of cleaning is not set, the moving robot 100 performs cleaning while moving to a close area.

During cleaning, the moving robot 100 periodically transmits data on the current position and a cleaning state to the external terminal 50 (S630).

The external terminal 50 displays the position of the moving robot 100 in move and the cleaning state (S640). The external terminal 50 displays a selected designated area distinguishably from other areas, and displays a cleaning complete area and a cleaning ongoing area distinguishably.

When the cleaning is completed (S650), the moving robot 100 stores a cleaning record and transmits data on the completion of cleaning to the external terminal 50 (S660).

The external terminal 50 may display, on a screen, completion of cleaning based on the received data (S670).

A first embodiment, in which a map is learned by separating a travel area X into a plurality of small areas or a current position is recognized, is described as follows.

Figure 11:
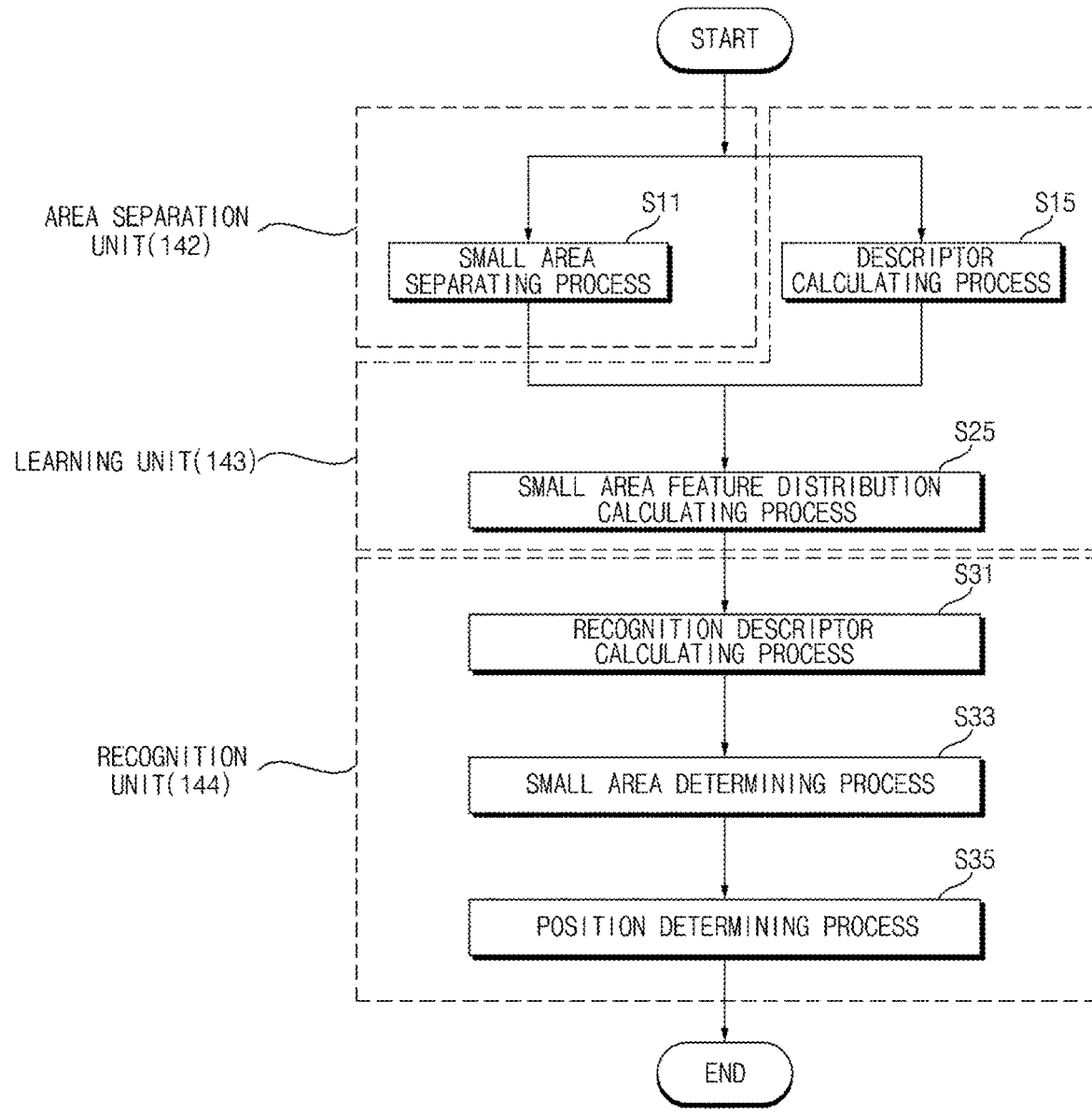
FIG. 11 is a flowchart illustrating a control method of a moving robot according to a first embodiment of the present invention.

FIG. 11 is a flowchart illustrating a control method of a moving robot according to a first embodiment of the present invention.

The area separation unit 142 separates the travel area X into a plurality of small areas by a predetermined criterion.

The first control method according to the first embodiment includes: a small area separating process (S11) in which the travel area X is separated into the plurality of small areas by the predetermined criterion (S11); a learning process in which the travel area is learned and thereby a map is generated; and a recognizing process in which the current position is determined on the map. The small area separating process (S11) and the learning process may be partially performed at the same time.

The learning process includes a descriptor calculating process (S15) in which images are acquired at a plurality of positions in each small area, features are extracted from each image, and a descriptor corresponding to each feature is calculated. The descriptor calculating process (S15) may be performed at the same time with the small area separating process (S11).

The learning process includes, after the small area separating process (S11) and the descriptor calculating process (S15), a small area feature distribution calculating process (S25) in which a small area feature distribution calculated for each small area based on a plurality of descriptors by a predetermined learning rule is stored.

The recognizing process includes a recognition descriptor calculating process (S31) in which an image at the current position is acquired, the at least one recognition feature is acquired from the acquired image, and the recognition descriptor corresponding to the recognition feature is calculated.

The recognizing process includes, after the recognition descriptor calculating process (S31), a small area determining process (S33) in which each small area feature distribution and each recognition descriptor are calculated by a predetermined estimation rule to determine a small area in which the current position is included in.

The recognizing process includes, after the small area determining process (S33), a position determining process (S35) in which the current position is determined from among a plurality of position in the determined small area. In the position determining process, any one node out of a plurality of nodes on the map may be selected.

The above-described learning process includes a traveling and image acquiring process, a descriptor generating process, and a node generating process.

In the traveling and image acquiring process, the controller acquires an image at each spaced point (an actual position) during traveling, and stores an acquisition image corresponding to each point.

The learning unit generates descriptors respectively corresponding to a plurality of features extracted from an acquired image, and the plurality of descriptors corresponds to the plurality of features one by one. The learning unit generates node information, so that each node correspond to coordinate information of each point and each image information correspond to a corresponding node.

In the learning process, small area label descriptors are generated based on the plurality of descriptors, and a plurality of descriptors in each small area is classified into a plurality of groups. A small area label descriptor representative of descriptors classified into the same group is generated. A small area label descriptor is generated based on descriptors classified into the same group by a predetermined label rule. A small area feature distribution is generated based on a plurality of small area label descriptors.

The information generated as above is stored along with the map.

In the recognizing process, a plurality of features is extracted from an image acquired at an unknown current position, that is, a recognition image, and recognition descriptors respectively corresponding to the plurality of extracted recognition features are generated. The plurality of recognition features correspond to the plurality of recognition descriptors one by one. This process may be performed after at least one recognition image is acquired at the unknown current position.

Generating features and descriptors is similar to the above-described learning process, but, in order to distinguish data of a map and data used to recognize the current position, recognition features and recognition descriptors are herein used distinguishably.

In the recognizing process, after the features and the descriptors are generated, a plurality of small area label descriptors for each comparison subject small area is compared with the plurality of recognition descriptors. During the comparison, a small area feature distribution and a recognition feature distribution may be compared for each comparison subject small area.

In the recognizing process, a small area in which an unknown current position is estimated to be included is selected from among a plurality of small areas, and a small area having the highest similarity is selected.

In the recognizing process, descriptor information of an image corresponding to each comparison subject node is compared with recognition descriptor information corresponding to a recognition image. During the comparison, the comparison subject node is a node in a plurality of nodes in the selected area. For example, during the comparison, a similarity for each comparison subject node may be calculated by comparing a plurality of label descriptors corresponding to each node with a plurality of label descriptors generated based on the recognition image and then converted.

A node estimated to be the current position may be selected from among one or more comparison subject nodes, and a node having the highest similarity among the comparison subject nodes may be selected.

A second embodiment, in which a map is learned by separating a travel area X is separated into a plurality of small areas or a current position is recognized, is herein described as follows.

Figure 12:
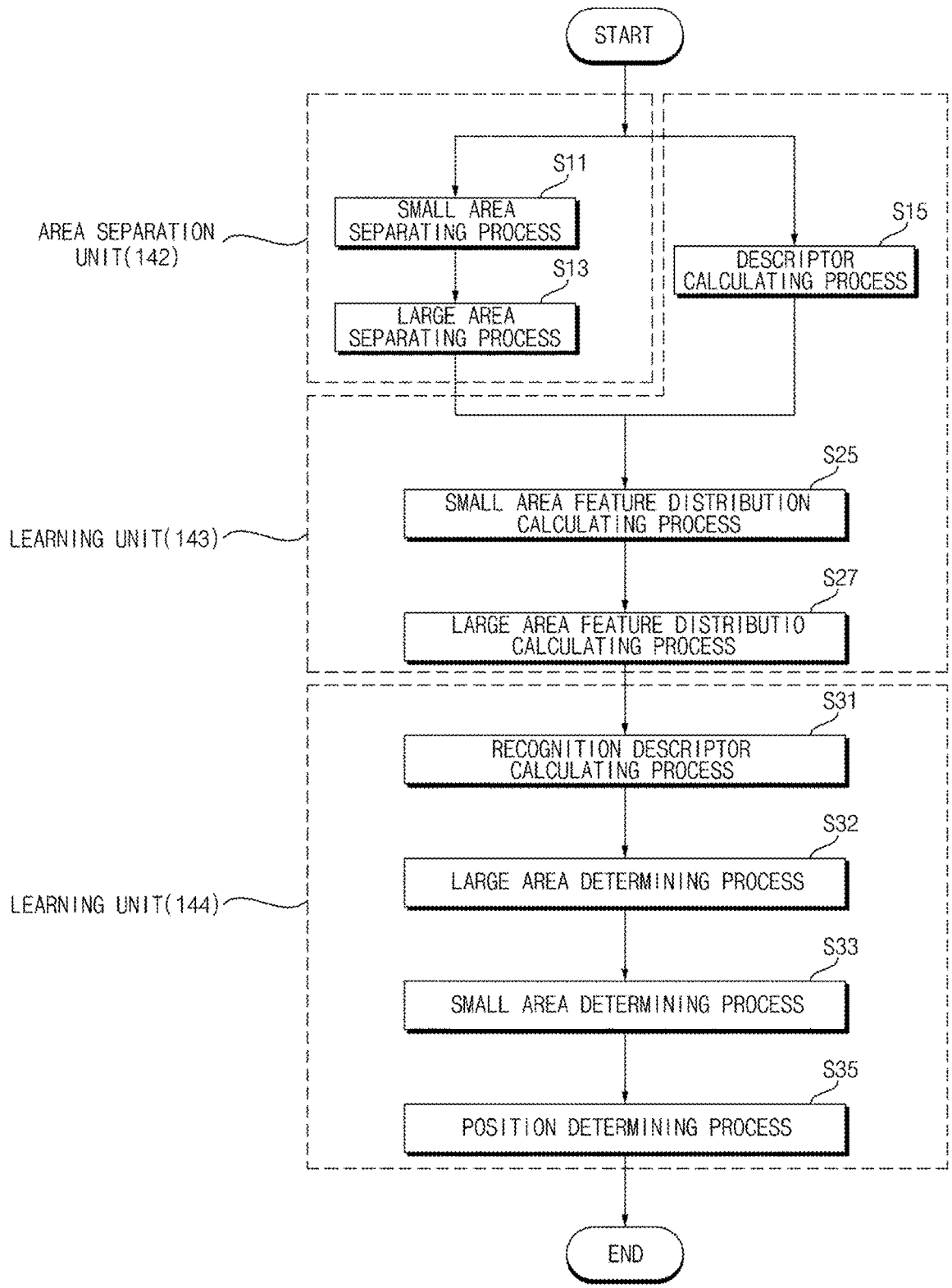
FIG. 12 is a flowchart illustrating a control method of a moving robot according to the second embodiment of the present invention.

FIG. 12 is a flowchart illustrating a control method of a moving robot according to the second embodiment of the present invention.

The control method according to the second embodiment includes: a small area separating process (S11) in which the travel area X is separated into a plurality of small areas by a predetermined criterion; and a large area separating process (S13) in which the travel area X is separated by a predetermined criterion into a plurality of large areas into which the plurality of small areas are classified. Here, a process including at least one of the small area separating process (S11) or the large area separating process (S13) may be referred to as an "area separating process". The small area separating process (S11) or the large area separating process (S13) may be performed simultaneously or any one thereof may be performed first.

In the second embodiment, the area separating process may enable separating the travel area X by a predetermined criterion into a plurality of large areas which are separated in terms of a moving capability.

The control method according to the second embodiment includes a learning process in which a map is generated by learning the travel area, and a recognizing process in which the current position is determined on the map. The area separating process (S11, S13) and the learning process may be partially performed at the same time.

The learning process includes a descriptor calculating process (S15) in which images are acquired at a plurality of positions in each large area, features is extracted from the respective images, and descriptors are calculated. The descriptor calculating process (S15) may be performed at the same time with the area separating process (S11, S13).

After the area separating process (S11, S13) and the descriptor calculating process (S15), the learning process include a small area feature distribution calculating process (S25) in which a small area feature distribution calculated for each small area by a predetermined learning rule based on a plurality of descriptors is stored.

After the small area feature distribution calculating process (S25), the learning process further include a large area feature distribution calculating process (S27) in which a large area feature distribution calculated for each large area by a predetermined superordinate learning rule based on a plurality of small area feature distributions is stored.

The recognizing process includes a recognition descriptor calculating process (S31) in which an image of the current position is acquired, at least one recognition feature is extracted from the acquired image, and a recognition descriptor corresponding to each recognition feature is calculated.

The recognizing process includes, after the recognition descriptor calculating process (S31) and before the small area determining process (S33), a large area determining process (S32) in which each large area feature distribution and each recognition descriptor are computed by a predetermined superordinate estimation rule so as to determine a large area in which the current position is included.

After the recognition descriptor calculating process (S31), the recognizing process includes a small area determining process (S33) in which each small area feature distribution and each recognition descriptor are computed by a predetermined estimation rule so as to determine one of a plurality of small areas included in the large area determined in the large area determining process.

After the small area determining process (S33), the recognizing process includes a position determining process (S35) in which the current position is determined from among a plurality of positions in the determined small area.

Figure 13:
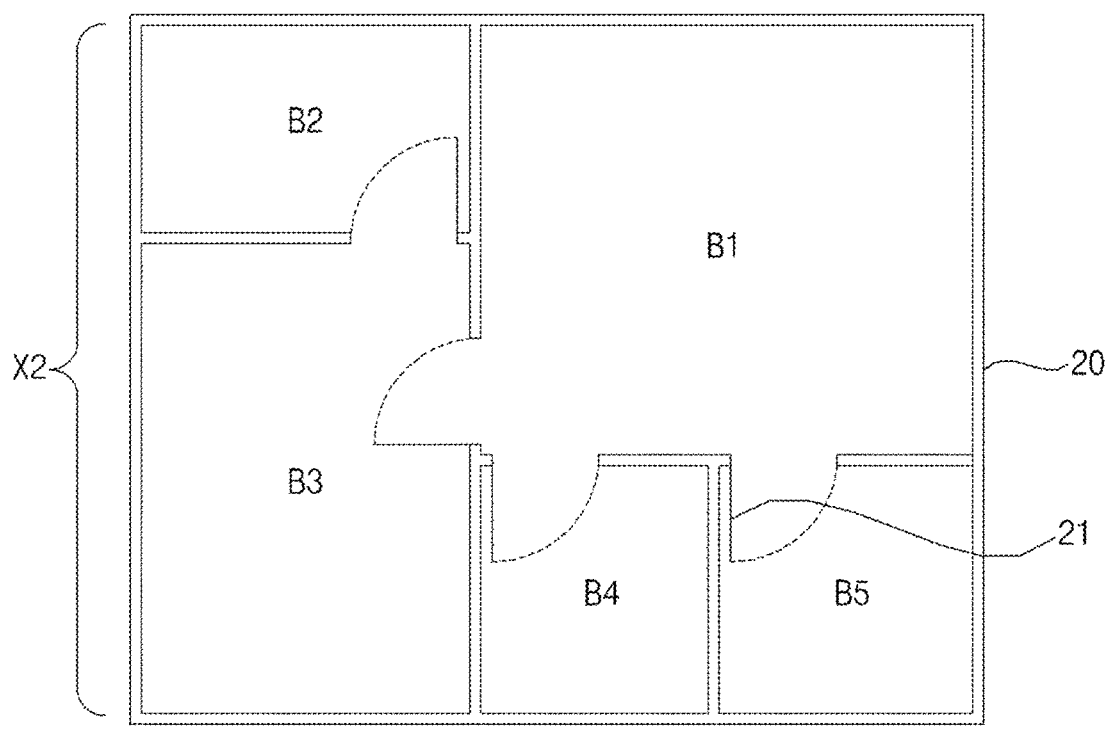
FIG. 13 is a diagram illustrating a method for recognizing a small area and a large area by a moving robot of the present invention.

FIG. 13 is a diagram illustrating a method for recognizing a small area and a large area by a moving robot of the present invention.

As illustrated in FIG. 13, small areas may be separated on the basis of each room B1, B2, B3, B4, and B5 in a travel area X3. In FIG. 13, each room B1, B2, B3, B4, and B5 is separated by a wall 20 and a door 21 which can be opened and closed. The area separation unit 142 may separate each room and other areas as small areas B1, B2, B3, B4, and B5 on the basis of room.

Figure 14:
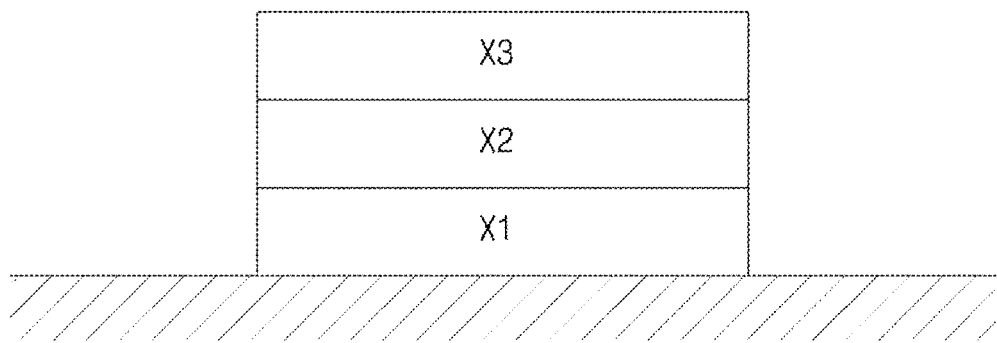
FIG. 14 is a diagram illustrating an example of a plurality of large areas used for area recognition by a moving robot of the present invention.

FIG. 14 is a diagram illustrating an example of a plurality of large areas used for area recognition by a moving robot of the present invention.

As illustrated in FIG. 14, a plurality of large areas (e.g., X1, X2, and X3) may be separated on the basis of floors in a travel area X.

Figure 15:
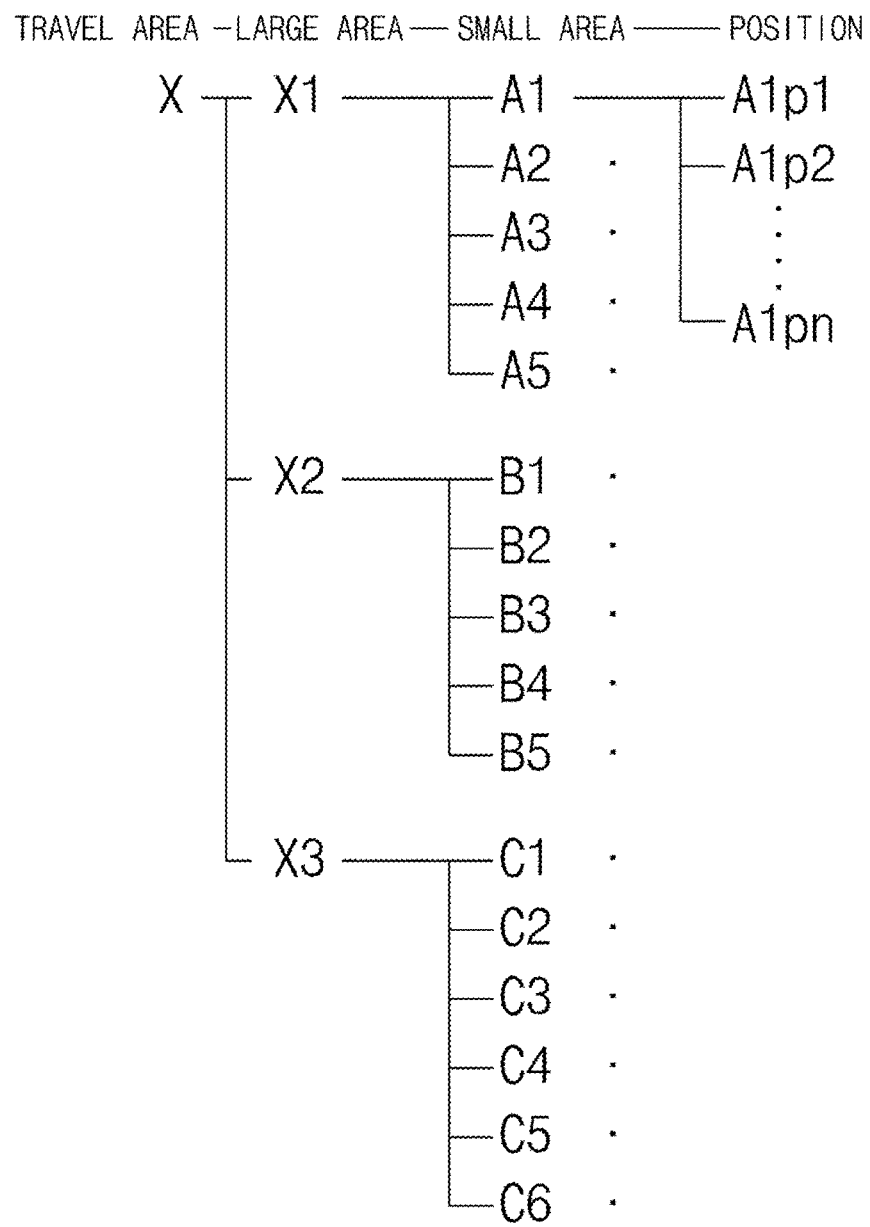
FIG. 15 is a conceptual diagram illustrating a superordinate and subordinate relationship between a plurality of areas used for area recognition by a moving robot of the present invention.

FIG. 15 is a conceptual diagram illustrating a superordinate and subordinate relationship between a plurality of areas used for area recognition by a moving robot of the present invention.

As illustrated in FIG. 15, the travel area X is comprised of a plurality of large areas X1, X2, and X3, each of the large areas X1, X2, and X3 is compared of a plurality of small areas which constitutes a corresponding large area, and each of the small areas A1 to A5, B1 to B5, and C1 to C6 is compared of a plurality of positions which constitutes a corresponding small area.

For example, a large area X1 may be comprised of a plurality of small areas A1 to A %, and a mall area A1 may be comprised of A1p1, A1p2, A1p3, . . . , and A1pn (n is a natural number).

Each of the small areas (A1 to A5, B1 to B5, and C1 to C6) is comprised of a plurality of positions which constitute a corresponding small area. For example, a small area Z1 may be comprised of a plurality of positions A1p1, A1p2, A1p3, . . . , and A1pn (n is a natural number).

In addition, it is possible to associate the small area A1 with data obtained from an acquisition image acquired at each position.

Figure 16:
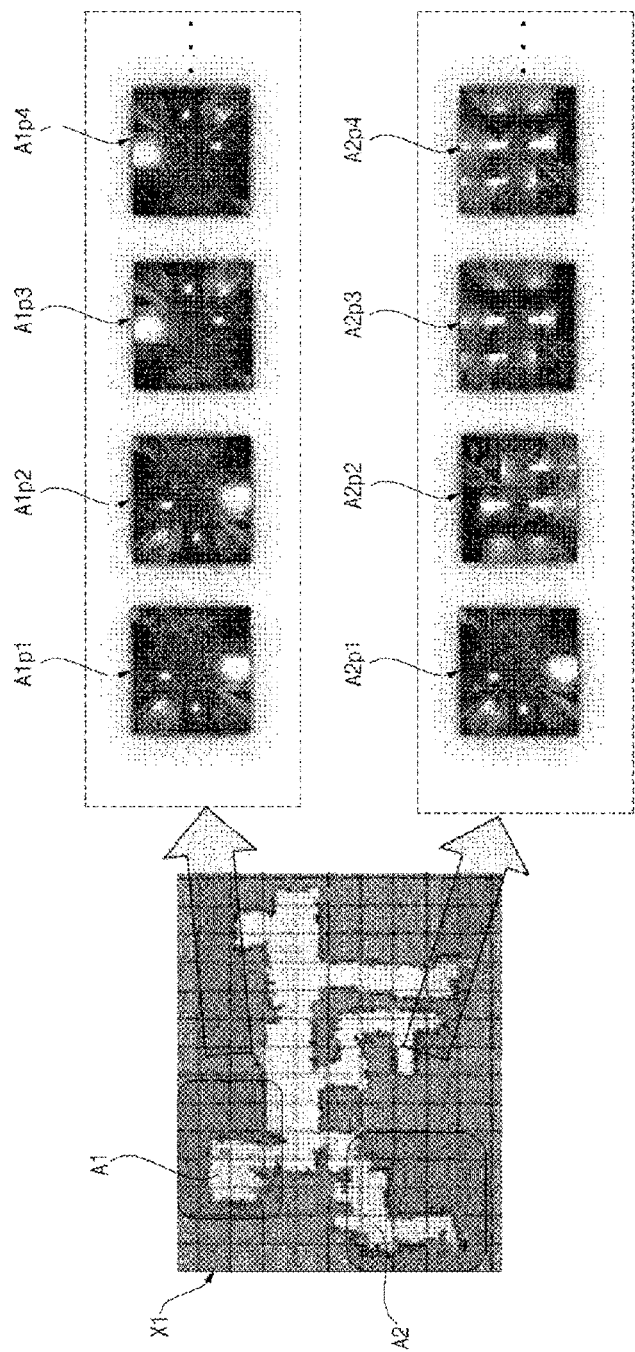
FIG. 16 is a diagram illustrating an example of images of a plurality of areas used for area recognition by a moving robot of the present invention.
Figure 17:
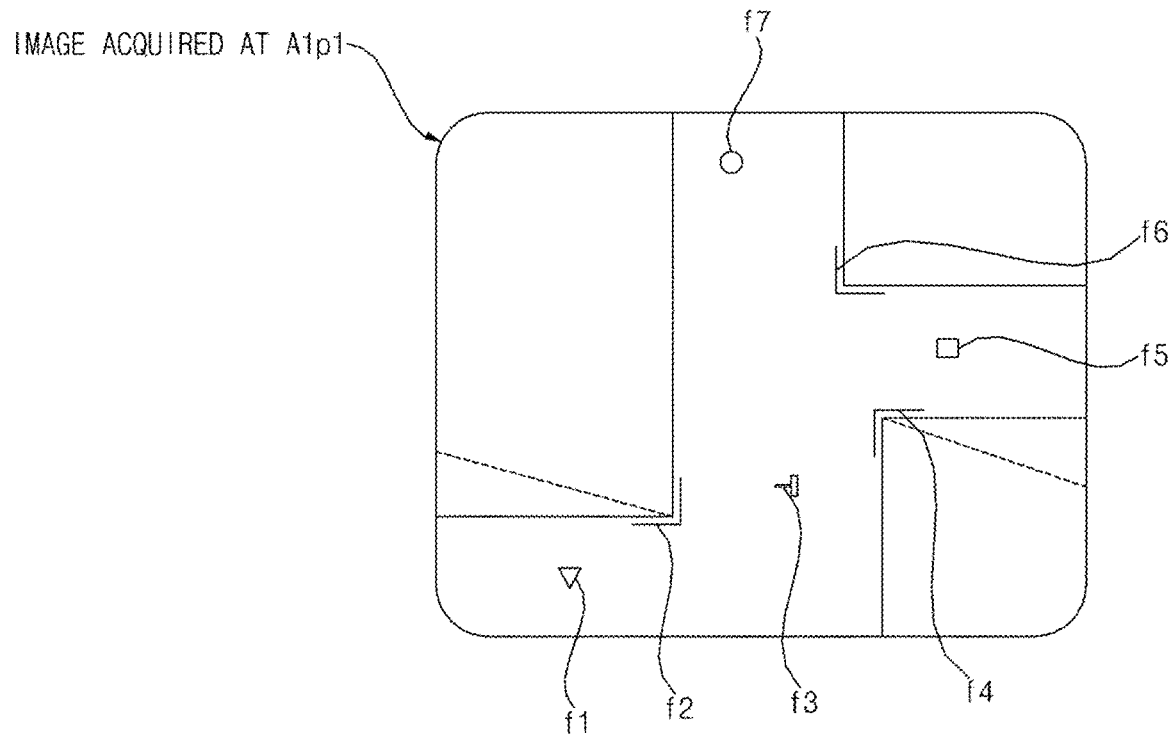
FIG. 17 is a diagram illustrating features of an image acquired at any one position in FIG. 16.

FIG. 16 is a diagram illustrating an example of images of a plurality of areas used for area recognition by a moving robot of the present invention, and FIG. 17 is a diagram illustrating features of an image acquired at any one position in FIG. 16.

As illustrated in FIG. 16, each position (e.g., A1p1, A1p2, A1p3, . . . , and A1pn) corresponds to an acquisition image acquired at a corresponding position. Each position, and data acquired from an acquisition image corresponding to each position may be stored in the storage 150.

The image acquisition unit 120 acquires an acquisition image at each position of the moving robot 100. For example, as illustrated in FIG. 17, an image captured at a position A1p1 in the small area A1 in the travel area X may be stored.

The learning unit 143 extracts features (e.g., f1, f2, f3, f4, f5, f6, and f7) from images acquired at a plurality of positions. Descriptions about various methods for detecting features from an image in computer vision and various feature detectors suitable for feature detection are the same as described above.

Figure 18:
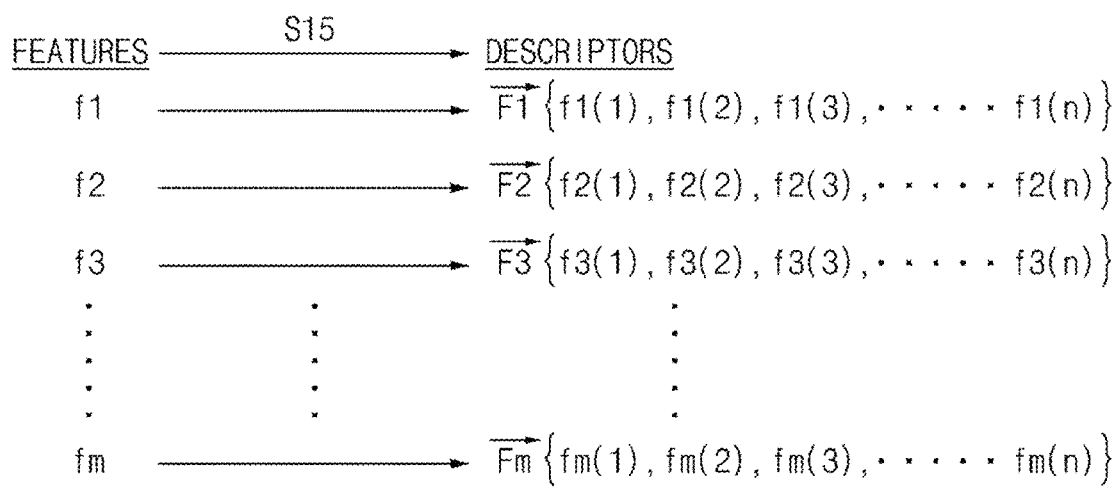
FIG. 18 is a conceptual diagram illustrating how to calculate a descriptor which is an n-dimensional vector for a particular area according to an embodiment of the present invention.

FIG. 18 is a conceptual diagram illustrating how to calculate a descriptor which is an n-dimensional vector for a particular area according to an embodiment of the present invention.

As illustrated in FIG. 18, the learning unit 143 calculates descriptors corresponding to features f1, f2, f3, . . . , and fm. This is a diagram illustrating how to calculate descriptors based on the respective features f1, f2, f3, . . . , and fm through the descriptor calculating process (S15).

For feature detection, the features f1, f2, f3, . . . , and fm may be converted into descriptors using Scale Invariant Feature Transform (SIFT). The descriptors may be represented by n-dimensional vectors. (n is a natural number).

$\vec{F1}, \vec{F2}, \vec{F3}, \ldots, \vec{Fm}$ denotes n-dimensional vectors. f1(1), f1(2), f1(3), . . . , f1(n) within the brace of $\vec{F1}$ denote values of dimensions that constitute $\vec{F1}$. The remaining $\vec{F2}$, $\vec{F3}$, . . . , $\vec{Fm}$ are expressed in this manner and thus description thereof is omitted.

For example, the SIFT is an image recognition technique by which easily distinguishable features f1, f2, f3, f4, f5, f6, and f7, such as corners, are selected in an acquisition image of FIG. 17 and n-dimensional vectors are obtained, which are values of dimensions indicative of a degree of radicalness of change in each direction with respect to a distribution feature (a direction of brightness change and a drastic degree of the change) of gradient of pixels included in a predetermined area around each of the features f1, f2, f3, f4, f5, f6, and f7.

The SIFT enables detecting a feature invariant to a scale, rotation, change in brightness of a subject, and thus, it is possible to detect an invariant (i.e., rotation-invariant) feature of an area even when images of the area is captured by changing a position of the moving robot 100. However, aspects of the present invention are not limited thereto, and Various other techniques (e.g., Histogram of Oriented Gradient (HOG), Haar feature, Fems, Local Binary Pattern (LBP), and Modified Census Transform (MCT)) can be applied.

Figure 19:
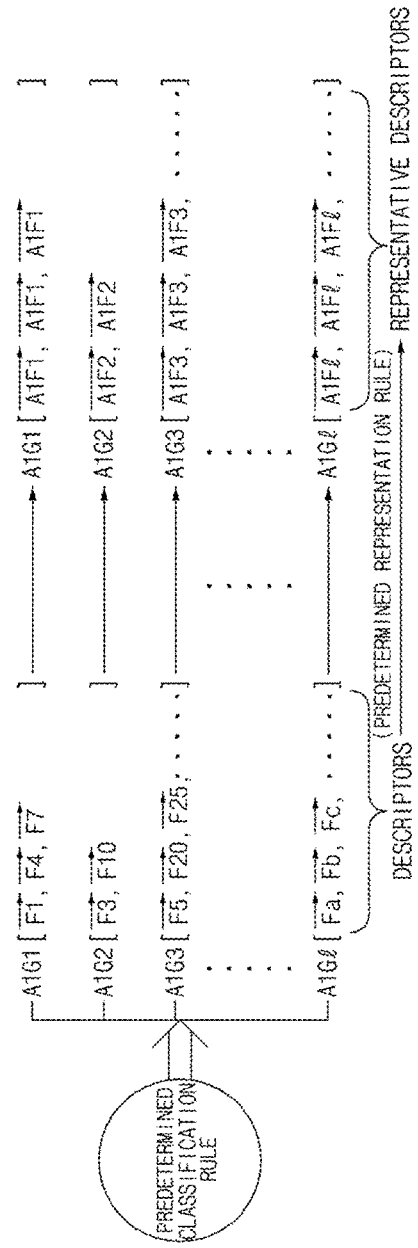
FIG. 19 is a conceptual diagram illustrating how to calculate a representative descriptors by a classification rule according to an embodiment of the present invention.
Figure 20A:
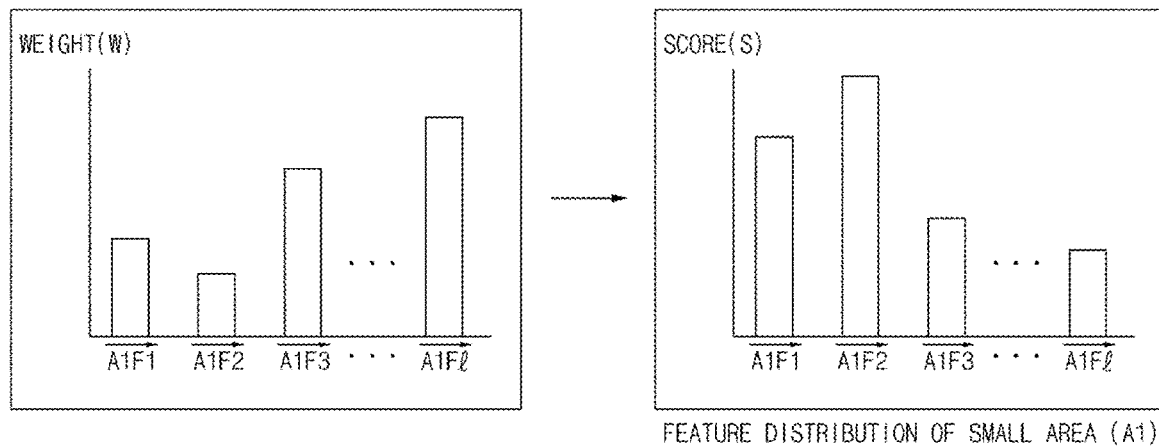
FIGS. 20A and 20B are diagram illustrating feature distributions according to an embodiment of the present invention.
Figure 20B:
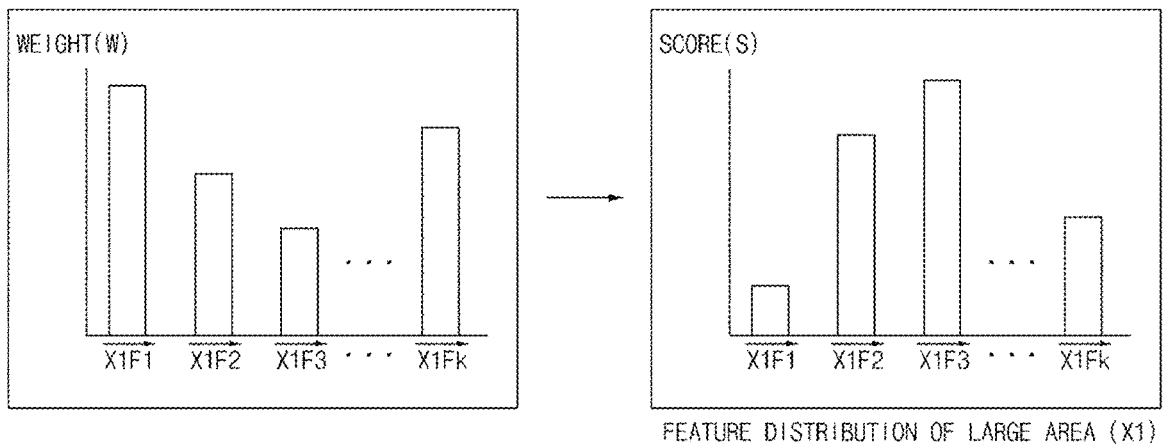

FIG. 19 is a conceptual diagram illustrating how to calculate a representative descriptors by a classification rule according to an embodiment of the present invention, and FIGS. 20A and 20B are diagram illustrating feature distributions according to an embodiment of the present invention.

As illustrated in FIG. 19, a plurality of descriptors calculated in a small area A1 is classified into a plurality of groups A1G1, A1G2, A1G3, . . . , and A1G1 by a predetermined classification rule. A plurality of descriptors included in the same group is converted into representative descriptors by a predetermined representation rule.

The learning unit 143 may classify at least one descriptor of each acquisition image into a plurality of groups based on descriptor information, obtained from an acquisition image acquired at each position, by a predetermined subordinate classification rule and may convert descriptors in the same group into subordinate representative descriptors by a predetermined subordinate representation rule (in this case, if only one descriptor is included in the same group, the descriptor and a subordinate representative descriptor thereof may be identical).

In another example, all descriptors obtained from acquisition images of a predetermined area, such as a room, may be classified into a plurality of groups by a predetermined subordinate classification rule, and descriptors included in the same group may be converted into subordinate representative descriptors by the predetermined subordinate representation rule.

The predetermined representation rule may be based on an average of at least one descriptor (n-dimensional vector) classified into the same group.

Through this process, a feature distribution for each position may be obtained, as illustrated in FIGS. 20A and 20B. A distribution of each position may be represented by a histogram or an n-dimensional vector. This is a histogram of the small area A1, where a score (s) increasing in proportion of the number (w) of representative descriptors is used as a frequency, and it is a drawing for visually illustrating a feature distribution for the small area A1.

Using all acquisition image acquired in any one area, types of all representative descriptors in the area and the number (w) of representative descriptors per type may be calculated. An area feature distribution may be represented by a histogram, where types of representative descriptors are representative values (values on the horizontal axis) and scores (s) increasing in disproportion to the number (w) of representative descriptors per type are frequencies (values on the vertical axis).

For example, a score (s1) of a particular representative descriptor may be defined to be the number (a total weight (w) of a corresponding area) of all representative descriptors calculated in the corresponding area (which means an area, of which a feature distribution is desired to obtain) corresponding to a weight (w1) of the particular representative descriptor.

If a greater score (s) is assigned to a representative descriptor calculated by a rare feature and thereby the rare feature exists in an acquisition image of an unknown current position which will be described later, a small area in which an actual position is included may be estimated more accurately.

An area feature distribution histogram may be represented by an area feature distribution vector in which each representative value (representative descriptor) is regarded as each dimension and a frequency (score s) of each representative value is regarded as a value of each dimension.

A feature distribution vector of each small area on the map may be learned by the learning unit 143, but my be stored in a manner in which an external data is input to the moving robot 100.

Figure 21:
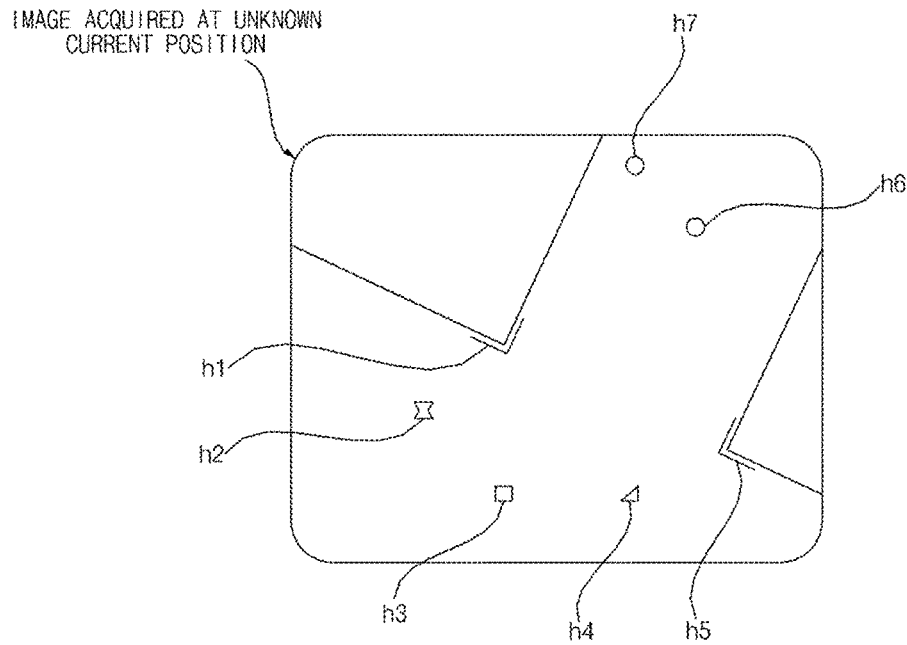
FIG. 21 is a diagram illustrating recognition features in an image acquired by a moving robot of the present invention at an unknown current position.

FIG. 21 is a diagram illustrating recognition features in an image acquired by a moving robot of the present invention at an unknown current position.

The following is description about a process of estimating a small area, in which a current position is included, based on data such a feature distribution vector of each small area when the current position of the moving robot 100 becomes unknown due to position jumping and the like.

The moving robot 100 acquires an acquisition image at the unknown current position through the image acquisition unit 120. The recognition unit 144 extracts the at least one recognition feature from an image acquired at the unknown current position. FIG. 21 illustrates an example of the image captured at the unknown current position, in which a plurality of recognition features h1, h2, h3, h4, h5, h6, and h7 located at the ceiling is found.

The recognition unit 144 detects features from the acquisition image. Descriptions about various methods for detecting features from an image in computer vision and various feature detectors suitable for feature detection are the same as described above.

Through the image captured at the unknown current position, various features such as lighting devices, edges, corners, blobs, ridges, etc. located at a ceiling are found.

Figure 22:
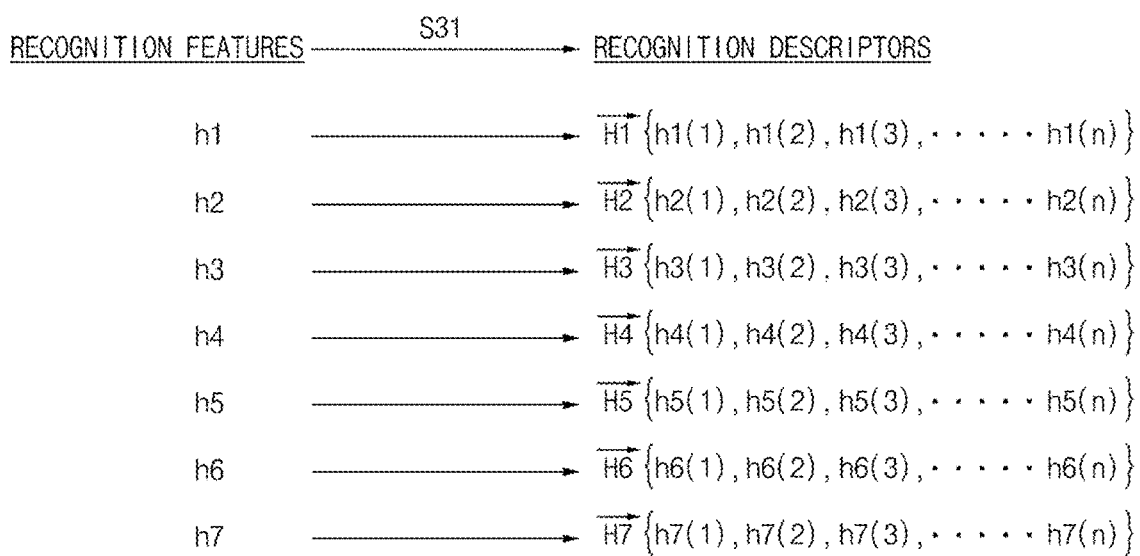
FIG. 22 is a conceptual diagram illustrating how to calculate a recognition descriptor which is an n-dimensional vector for a recognition feature of the image acquired in FIG. 21.
Figure 23A:
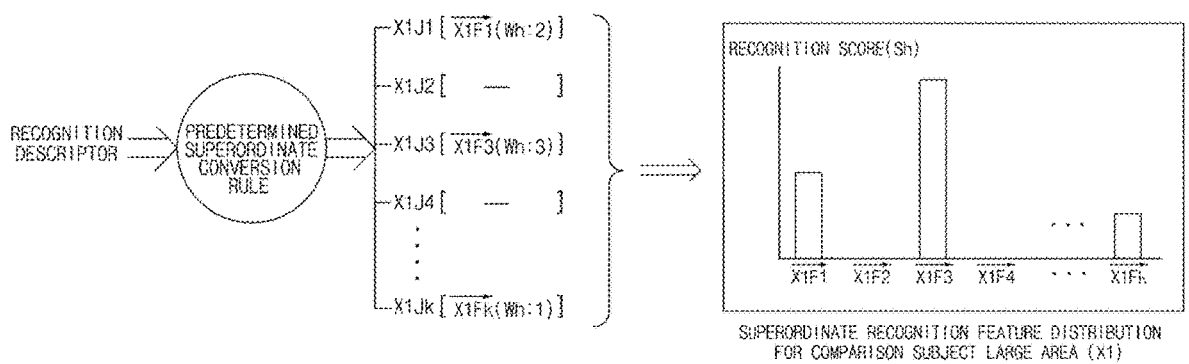
FIGS. 23A and 23B are diagrams illustrating a process of calculating a feature distribution from a recognition descriptor.
Figure 23B:
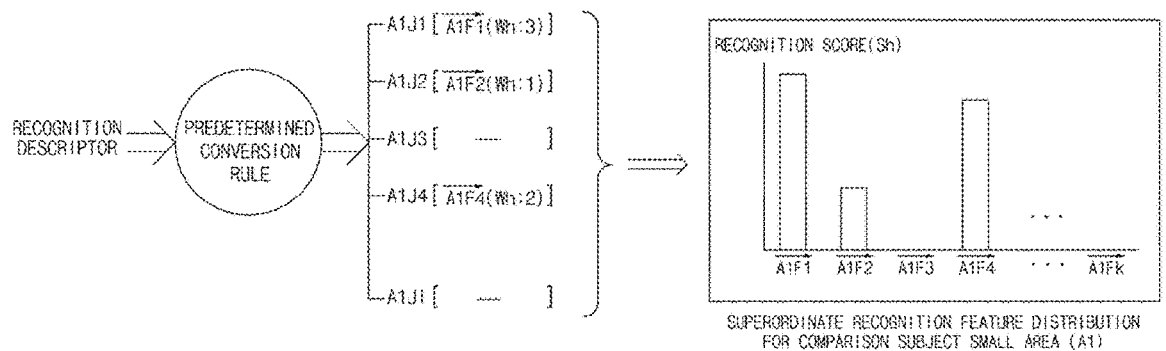

FIG. 22 is a conceptual diagram illustrating how to calculate a recognition descriptor which is an n-dimensional vector for a recognition feature of the image acquired in FIG. 21, and FIGS. 23A and 23B are diagrams illustrating a process of calculating a feature distribution from a recognition descriptor.

FIG. 22 is a diagram illustrating how to calculate recognition descriptors based on respective recognition features h1, h2, h3, ... through the recognition descriptor calculating process (S31). The term "recognition feature" is a term used to describe a process performed by the recognition unit 144, and defined distinguishable from the term "feature" which is used to describe a process performed by the learning unit 143, but these terms are defined merely to indicate characteristics of the world outside the moving robot 100.

For such feature detection, the recognition features h1, h2, h3, ..., hn may be converted into recognition descriptors using the SIFT. The recognition descriptors may be represented as n-dimensional vectors. In FIG. 28, $\vec{H1}$, $\vec{H2}$, $\vec{H3}$, ..., $\vec{H7}$ indicate n-dimensional vectors. h1(1), h1(2), h1(3), ..., h1(n) within the brace { } of $\vec{H1}$, indicate values of respective dimensions of $\vec{H1}$. Other vectors are represented in the same way and thus detailed description thereof is herein omitted.

As described above, the SIFT is an image recognition technique, by which easily distinguishable features h1, h2, h3, h4, h5, h6, and h7, such as corners, are selected in an acquisition image of FIG. 21 and then an n-dimensional vector is obtained, which is each dimensional value indicative of a degree of radicalness of change in each direction with respect to a distribution feature (a direction of brightness change and a degree of radicalness of the change) of gradient of pixels included in a predetermined area around each of the features h1, h2, h3, h4, h5, h6, and h7.

As illustrated in FIGS. 23A and 23B, based on information on at least one recognition descriptor obtained from an acquisition image of an unknown current position, the recognition unit 144 converts position information (e.g., a feature distribution for each position) which is comparable with comparison subject information (e.g., a recognition feature distribution) by a predetermined conversion rule. For example, by the predetermined conversion rule, it is possible to calculate a recognition feature distribution vector comparable with a feature distribution vector of each small area based on the at least one recognition descriptor. Recognition descriptors are respectively converted into close representative descriptors in units of comparison subject small areas through the predetermined conversion rule.

By a predetermined subordinate comparison, it is possible to calculate a similarity for each position by comparing feature distribution of each position with a corresponding recognition feature distribution. A similarity (probability) for the position may be calculated, and a position with the highest probability may be selected as the current position of the moving robot 100.

The recognition unit 144 selects a small area in which the current position is included, by computing the respective small area feature distributions and the respective recognition descriptors by a predetermined estimation rule.

In one embodiment, with reference to each dimension (each representative descriptor) of a small area feature distribution vector of any one small area which is a comparison subject, at least one recognition descriptor may be converted into a representative descriptor having the shortest distance between vectors by a predetermined conversion rule. For example, a recognition descriptor may be converted into a representative descriptor having the shortest distance among representative descriptors which constitute a feature distribution for the corresponding small area.

Furthermore, when a distance between a recognition descriptor and a descriptor closest to the recognition descriptor in the predetermined conversion rule exceeds a predetermined value, conversion may be performed based on information on remaining recognition descriptors except the corresponding recognition descriptor.

When it comes to comparison with any one comparison subject small area, a recognition feature distribution for the comparison subject small area may be defined based on types of the converted representative descriptors and the number (recognition weight wh) of representative descriptors per type. The recognition feature distribution for the comparison subject small area may be represented as a recognition histogram, where a type of each converted representative descriptor is a representative value (a value on the horizontal axis) and a recognition score (sh) calculated based on the number of representative descriptors per type is a frequency (a value on the vertical axis). For example, a score (sh1) of any one converted representative descriptor may be defined as a value obtained by dividing a weight (wh1) of the converted representative descriptor by the number (a total recognition weight (wh)) of all representative descriptors converted from recognition descriptors.

If a greater recognition score (sh) is assigned in proportion of the number of converted represented descriptors calculated based on recognition features at an unknown position and thereby a number of similar recognition features exist in the acquisition image acquired at the current position, the similar recognition features may be regarded as major hint to estimate an actual position and thus a current position may be estimated more accurately.

A recognition histogram about a comparison subject position, which is an unknown current position, may be represented by a recognition feature distribution vector, where each representative value (converted representative descriptor) represents each dimension and a frequency of each representative value (recognition score sh) represents a value of each dimension. Using this, it is possible to calculate a recognition feature distribution vector comparable with each comparison subject small area.

Next, a feature distribution for each small area and a recognition feature distribution of each comparison subject small areas are compared and similarities therebetween are calculated to select a small area in which an unknown current position is included.

The predetermined estimation rule includes a predetermined comparison rule for comparing the respective small area feature distributions with the respective recognition feature distributions to calculate similarities therebetween. The respective small area feature distributions may be compared with the respective recognition feature distributions by the predetermined comparison rule and similarities therebetween may be calculated. For example, a similarity between any one small area feature distribution vector and a corresponding recognition feature distribution vector (which means a recognition feature distribution vector converted to be comparable by a predetermined conversion rule according to a comparison subject small area) is calculated.

A similarity (probability) for each small area subject to comparison may be calculated, and a small area having the highest probability may be selected as a small area in which the current position is included.

The recognition unit 144 may select the current position from among a plurality positions included in the selected small area.

Figure 24:
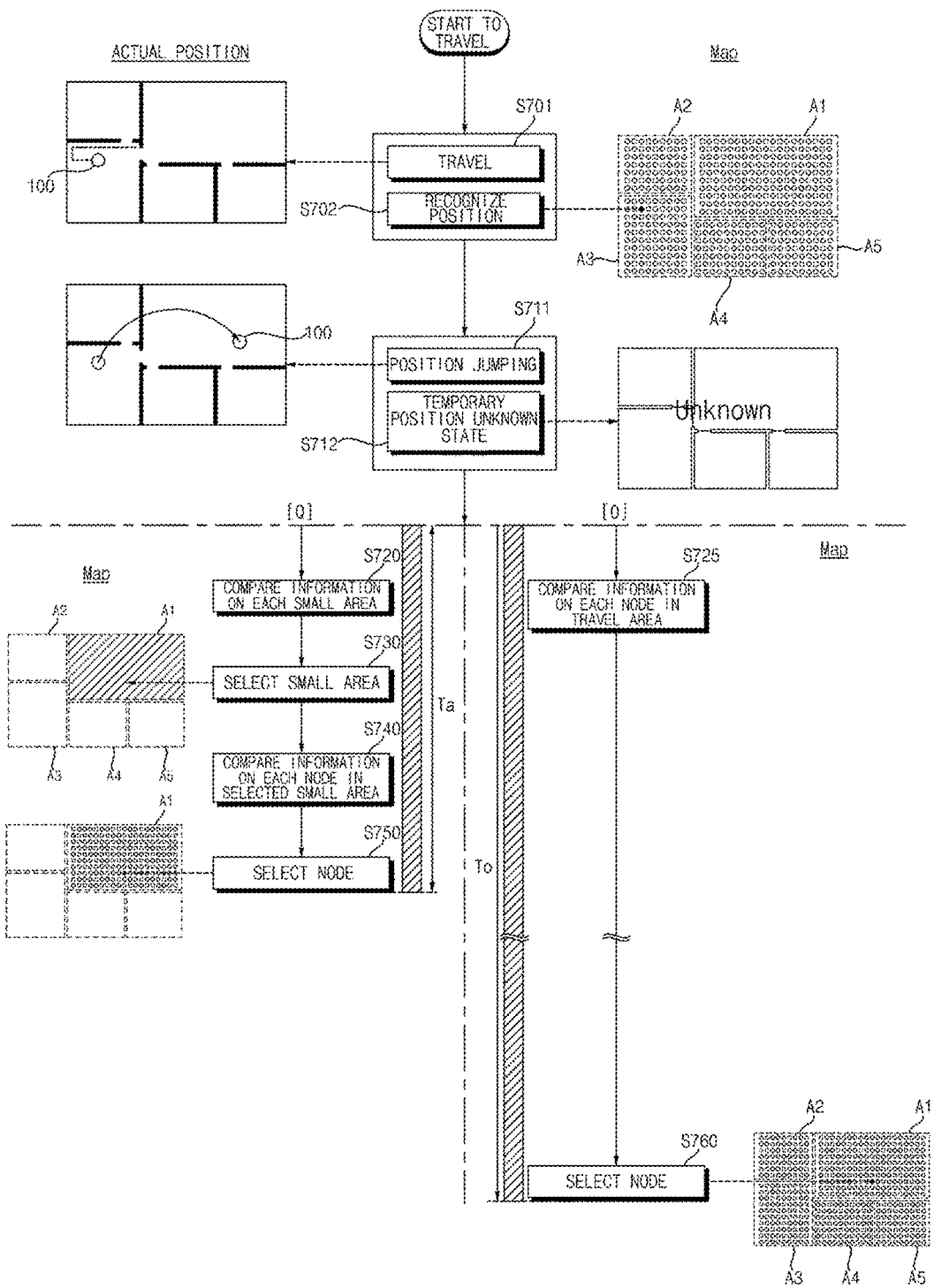
FIG. 24 is a flowchart illustrating a scenario for recognizing a position upon occurrence of a position jumping event.

FIG. 24 is a flowchart illustrating a scenario for recognizing a position upon occurrence of a position jumping event. As described above, the moving robot may recover the current position by generating a map and recognizing the current position based on the map.

As illustrated in FIG. 24, if the moving robot travels when a map is generated (S701), the moving robot recognizes the current position and matches a position on the map and the current position, thereby keeping traveling (S702).

If a position of the main body is changed during traveling or if power is off and then on again, the controller determines occurrence of a position jumping event (S711).

Since the controller is not capable of checking the current position (S712), the controller determines the current position through the recognition unit.

Depending on a degree of separation of areas, the recognition unit may perform comparison of information on each area (S720), and comparison of information on each node in a travel area (S725).

When areas are separated, any one small area is selected through comparison (S730), and information on each node in the selected small area is compared (S740), a node estimated to be the current position is selected (S750), and thereby the current position is recognized.

Meanwhile, when areas are not separated, the recognition unit compares information on each node in the travel area (S725), and selects a node having the highest similarity based on a result of comparison of node information (S760), and thereby recognizes the current position.

If recognizing the current position as above, the controller may perform preset cleaning subsequently. In addition, when a particular area is designated as a cleaning area, the controller moves to a position designated based on the recovered current position and then performs cleaning.

Meanwhile, in the case where the map is learned or the current position is recognized by separating the travel area X into a plurality of large areas which are separated by a moving capability, if a large area is determined, the controller 140 may determine one of a plurality of positions included in the large area, without determining one of a plurality of small areas included in the large area.

For example, two indoor spaces completely separated by a moving path may be separated into two large areas. In another example, even in the same indoor space, the large areas may be separated on the basis of floors in the travel area X.

The recognition unit 144 may determine one of a plurality of small areas included in the determined large area, and determine the current position from among a plurality of positions included in the determined small area. In this case, a process of determining one of the plurality of small areas included in the determined large area is the same as description about the first embodiment using a predetermined estimation rule.

As described above, while the present invention has been particularly shown and described with reference to the example embodiments thereof, it will be understood by those of ordinary skill in the art that the above embodiments of the present invention are all exemplified and various changes, modifications and equivalents may be made therein without changing the essential characteristics and scope of the present invention.

What is claimed is:
1. A moving robot, comprising:
a movable main body;
a travel drive unit having a plurality of drive wheels to move the main body;
an image acquisition unit configured to acquire images of surroundings;
a storage configured to store the images acquired by the image acquisition unit and a map of a travel area; and
a controller configured to recognize a current position to control the travel drive unit and control the moving robot to perform cleaning, wherein the controller is further configured to:

when a cleaning command is received, determine whether a position on the map and the current position match according to whether a position of the main body is jumped while the moving robot is driving continuously;

recover the position on the map to the jumped current position of the main body; and move to a designated area in response to the cleaning command and control the moving robot to perform cleaning.

2. The moving robot of claim 1, wherein the controller is further configured to:

when the position on the map and the current position do not match each other, extract features from the acquisition images received from the image acquisition unit; and based on the features, determine one of a plurality of areas included in the map to be the current position.

3. The moving robot of claim 1, wherein the controller is further configured to:

set a path from the current position to the designated area; and control the travel drive unit to move to the designated area and perform cleaning of the designated area.

4. The moving robot of claim 1, wherein the controller is further configured to:

when the designated area set to be a plurality of designated areas, determine whether a priority area is set;

perform cleaning of the priority area; and perform leaning of other designated areas.

5. The moving robot of claim 1, wherein the controller is further configured to, when the designated area is a plurality of designated areas, perform cleaning of the plurality of designated areas sequentially in a set order of cleaning.

6. The moving robot of claim 1, wherein the controller is further configured to:

when the designated area is a plurality of designated areas, move to a designated area close to the current position and perform cleaning; and perform cleaning according to ascending order of moving distance between the designated areas.

7. The moving robot of claim 1, wherein the controller is further configured to:

when the map is not stored in the storage, analyze the acquisition images acquired during traveling in the travel area;

separate the travel area into a plurality of areas; and generate the map.

8. The moving robot of claim 1, wherein the controller is further configured to transmit the map to an external terminal that inputs the cleaning command, and wherein the external terminal displays the map on a screen, and inputs the cleaning command with respect to at least one of a plurality of areas included in the map.

9. The moving robot of claim 8, wherein the external terminal transmits the cleaning command by setting at least one of the plurality of areas included in the map as the designated area.

10. The moving robot of claim 8, wherein the external terminal sets a new area as the designated area, irrespective of the plurality of areas included in the map, through a provided input means and transmits the cleaning command.

11. The moving robot of claim 8, wherein the controller is further configured to transmit data on a position of the moving robot and a cleaning state to the external terminal, and wherein the external terminal displays the position of the moving robot and the cleaning state on the map based on the data received from the moving robot.

12. The moving robot of claim 1, wherein the travel drive unit further comprises a switch which is installed on the drive wheels, and which is operated by a weight of the main body applied to the drive wheels, and wherein the controller is further configured to determine whether the main body is raised off a floor and thereby the position thereof is jumped based on operation of the switch.

13. The moving robot of claim 2, wherein the controller comprises:

an area separation unit configured to separate the travel area into a plurality of small areas or a plurality of large areas by a predetermined criterion; and a recognition unit configured to extract at least one recognition feature from an image acquired at an unknown current position, calculate recognition descriptors respectively corresponding to the recognition features, and compute a feature distribution for each small area or large area and the recognition descriptor by a predetermined estimation rule, thereby determining any one area to which the main body belongs as the current position.

14. The moving robot of claim 13, wherein the area separation unit is further configured to, by a predetermined criterion, separate the travel area into a plurality of large areas into which the plurality of small areas is grouped, and wherein the recognition unit is further configured to:

determine a large area in which the current position is included, by computing a feature distribution for each large area and the recognition descriptor by a predetermined superordinate estimation rule; and determining a small area in which the current position is included, by computing a feature distribution for each small area among a plurality of small areas included in the determined large area and the recognition descriptor by the predetermined estimation rule.

15. The moving robot of claim 14, wherein the recognition unit is further configured to determine the current position by calculating correlation between a plurality of positions included in the determined small area.

16. The moving robot of claim 13, wherein the controller comprises a learning unit configured to:

extract features from images acquired at a plurality of positions;

calculate descriptors respectively corresponding to the features; and calculate a feature distribution for each small area or each large area by a predetermined learning rule.

17. A control method of a moving robot, comprising:

based on a map of a travel area separated into a plurality of areas, set at least one of the plurality of areas as a designated area and receive a cleaning command;

determine a current position in the plurality of areas on the map;

after a determination as to whether a position of the main body is jumped while the moving robot is driving continuously, when the current position does not match a position on the map, recover the position on the map to the current position of the main body;

set a moving path from the current position to the designated area and move to the designated area; and
perform cleaning of the designated area.

18. The control method of claim 17,
wherein, when the designated area is a plurality of designated areas, a priority area among the plurality of designated areas is cleaned and then the rest of the plurality of designated areas is cleaned, and
wherein, when an order of cleaning of the plurality of designated areas is set, the designated areas are cleaned sequentially according to the order of cleaning.

19. The control method of claim 17, wherein, when the designated area is a plurality of designated areas, the moving robot moves to a designated area close to the current position and perform cleaning, and performs cleaning according to ascending order of moving distance between the designated areas.

20. The control method of claim 17, wherein, during the determination as to whether the position of the main body is jumped while the moving robot is driving continuously, the moving robot determines in response to a signal received from a switch which is installed on the drive wheels and operated by a weight of the main body applied to the drive wheels, whether the main body is raised off a floor and thereby a position thereof is jumped based on the signal received from the switch.

21. The control method of claim 17, further comprising:
displaying the map through an external terminal;
selecting at least one of the plurality of areas on the map; and
receiving the cleaning command with respect to the selected area set as the designated area.

22. The control method of claim 16, further comprising:
displaying the map through an external terminal;
irrespective of separation of the plurality of areas included in the map, set a new area through an input means provided in the external terminal; and
receiving the cleaning command with respect to the new area set as the designated area.

23. The control method of claim 21, further comprising:
transmitting data from the moving robot to the external terminal; and
in response to the data, displaying a position of the moving robot and a cleaning state on the map displayed on the external terminal.

24. The control method of claim 17, wherein, when the current position does not match with the position on the map, an acquisition image acquired at the current position through the image acquisition unit is analyzed to extract features, and one of a plurality of areas included in the map is determined based on the features.

25. The control method of claim 24, further comprising determining the current position from among a plurality of positions included in the area determined from among the plurality of areas.

26. The control method of claim 17, wherein, when the current position does not match with the position on the map, at least one recognition feature is extracted from an acquisition image acquired at an unknown current position, a recognition descriptor corresponding to the recognition feature is calculated, and the recognition descriptor is computed with a feature distribution for each small area or large area by a predetermined estimation rule, thereby determining any one area as the current position.

27. The control method of 17, further comprising:
extracting features by analyzing an acquisition image acquired by the image acquisition unit during traveling in the travel area, and generating the map by separating the travel area into a plurality of areas based on the features; and
extracting features from images acquired at a plurality of positions, calculating descriptors respectively corresponding to the features, and calculating a feature distribution for each small area or large area by a predetermined learning rule.

28. A moving robot control system comprising:
a moving robot comprising an acquisition unit for acquiring images of surroundings and configured to perform cleaning by moving in a travel area based on a map of the travel area separated into a plurality of areas; and
an external terminal configured to store the map, and input a cleaning command to the moving robot by setting at least one of the plurality of areas as a designated area,
wherein, when the cleaning command is received, the moving robot determines whether a position of a main body is jumped while the moving robot is driving continuously, determines whether a position on the map and the current position match each other, and recovers the current position on the map to the changed current position of the main body, and performs cleaning by moving to the designated area in response to the cleaning command.

29. The moving robot control system of claim 28, wherein the external terminal is configured to display the map on a screen, and input the cleaning command to the moving robot by setting at least one of the plurality of areas included in the map as the designated area.

30. The moving robot control system of claim 28, wherein the external terminal is configured to set a new area as the designated area by touching or dragging at least one of the plurality of areas using a provided touch input means, and input the cleaning command to the moving robot.

31. The moving robot control system of claim 28, wherein the external terminal is configured to, in response to data received from the moving robot, a position of the moving robot and a cleaning state on the map.

* * * * *